(12) United States Patent
Park

(10) Patent No.: US 12,323,966 B2
(45) Date of Patent: Jun. 3, 2025

(54) METHOD AND APPARATUS FOR TRANSMITTING AND RECEIVING COORDINATION INFORMATION FOR SIDELINK COMMUNICATION

(71) Applicant: KT CORPORATION, Gyeonggi-do (KR)

(72) Inventor: Kyujin Park, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 585 days.

(21) Appl. No.: 17/575,073

(22) Filed: Jan. 13, 2022

(65) Prior Publication Data

US 2022/0232585 A1 Jul. 21, 2022

(30) Foreign Application Priority Data

Jan. 15, 2021 (KR) .................. 10-2021-0006263
Jan. 5, 2022 (KR) .................. 10-2022-0001665

(51) Int. Cl.
*H04W 72/20* (2023.01)
*H04W 72/044* (2023.01)
*H04W 72/1263* (2023.01)
*H04W 72/23* (2023.01)
*H04W 72/51* (2023.01)
*H04W 92/16* (2009.01)
*H04W 92/18* (2009.01)

(52) U.S. Cl.
CPC ..... *H04W 72/1263* (2013.01); *H04W 72/044* (2013.01); *H04W 72/23* (2023.01); *H04W 72/51* (2023.01); *H04W 92/18* (2013.01)

(58) Field of Classification Search
CPC .......... H04W 72/1263; H04W 72/044; H04W 72/51; H04W 92/18
See application file for complete search history.

(56) References Cited

U.S. PATENT DOCUMENTS

| 11,968,026 B2* | 4/2024 | Alcorn ................ H04L 27/2601 |
| 2020/0153586 A1* | 5/2020 | Bai ........................ H04W 72/12 |
| 2020/0260463 A1* | 8/2020 | Lovlekar ............... H04W 76/15 |
| 2022/0167376 A1* | 5/2022 | Ryu .................... H04W 72/1263 |
| 2022/0322359 A1* | 10/2022 | Ye ........................ H04W 72/563 |
| 2023/0020105 A1* | 1/2023 | Shin .................... H04W 72/542 |

OTHER PUBLICATIONS

3GPP TSG RAN WG1 Meeting#84-BIS, R1-162986 Tityle:SRS position in eLAA (Year: 2016).*

(Continued)

*Primary Examiner* — Faruk Hamza
*Assistant Examiner* — Abusayeed M Haque
(74) *Attorney, Agent, or Firm* — IP Legal Services, LLC

(57) ABSTRACT

Provided are methods and apparatuses for transmitting and receiving coordination information for sidelink communication. The method includes: distinguishing a type of coordination information for the transmitting user equipment; determining whether a transmission trigger condition of the coordination information is satisfied according to the type of the coordination information; and transmitting the coordination information when the transmission trigger condition is satisfied.

9 Claims, 20 Drawing Sheets

(56) References Cited

OTHER PUBLICATIONS

Moderator (LG Electronics), "Feature lead summary for AI 8.11.2.2 Feasibility and benefits for mode 2 enhancements", R1-2009788, #3GPP TSG RAN WG1 #103-e, e-Meeting, Oct. 26-Nov. 13, 2020.
LG Electronics, "Discussion on feasibility and benefits for mode 2 enhancement", R1-2007896, 3GPP TSG RAN WG1 Meeting #103-e, e-Meeting, Oct. 26-Nov. 13, 2020.
Fujitsu, "Considerations on Inter-UE Coordination for Mode 2 Enhancements", R1-2007788, 3GPP TSG RAN WG1 Meeting #103-E, e-Meeting, Oct. 26-Nov. 13, 2020.
Convida Wireless, "On Resource Allocation Mode 2 Enhancement for NR Sidelink", R2-2010144, 3GPP TSG-RAN WG2 Meeting #112 electronic, Online, Nov. 2-13, 2020.
European Patent Office, European Search Report of corresponding EP Patent Application No. 22151627.1, Jun. 15, 2022.

\* cited by examiner

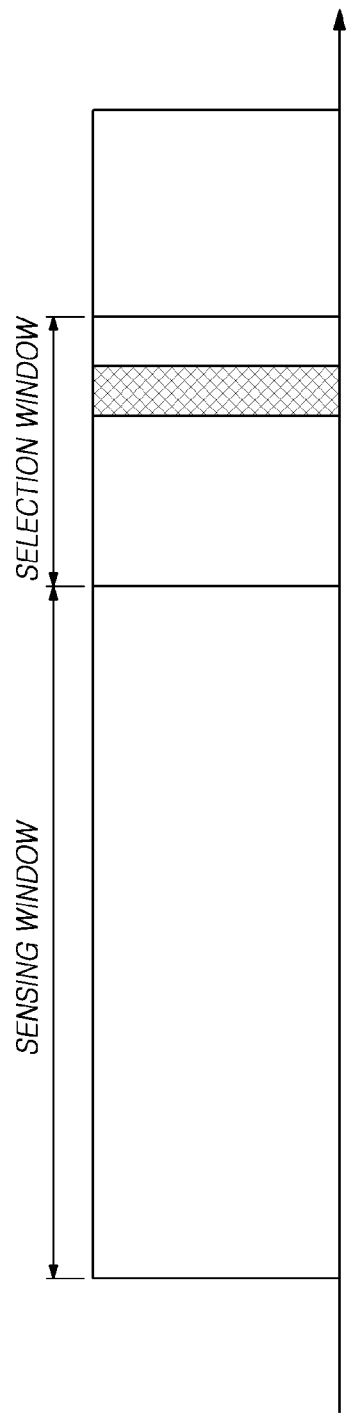

METHOD AND APPARATUS FOR TRANSMITTING AND RECEIVING COORDINATION INFORMATION FOR SIDELINK COMMUNICATION

CROSS-REFERENCE TO RELATED APPLICATION

This application claims the priority benefit of Korean Patent Application Nos. 10-2021-0006263, filed on Jan. 15, 2021 and 10-2022-0001665, filed on Jan. 5, 2022 in the Korean Intellectual Property Office, in accordance with the U.S. Patent Law 35 USC § 119(a), the disclosures of which are incorporated herein by reference in their entirety. In addition, if this application claims the priority benefit for countries other than the United States for the same reason as above, the disclosures of which are incorporated herein by reference in their entirety.

BACKGROUND

Field

The present disclosure relates to methods and apparatuses for transmitting and receiving coordination information for sidelink communication in a next-generation/5G radio access network (hereinafter, referred to as a new radio, "NR").

Description of Related Art

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from other (e.g., subcarrier spacing, subframe, Transmission Time Interval (TTI), etc.) as a method for efficiently satisfying each usage scenario requirement through a frequency band constituting any NR system.

Furthermore, there is a demand for developing a design for efficiently using radio resources for the sidelink communication without collision in NR sidelink communication using a sidelink, which is a radio link between terminals for providing a V2X service in NR, when multiple terminals perform sidelink communication, in particular, in the case of a communication mode that the base station does not schedule a radio resource.

BRIEF SUMMARY

In accordance with embodiments of the present disclosure, methods and apparatuses for transmitting and receiving the coordination information for the sidelink communication in the NR are provided for efficiently using radio resources for the sidelink communication without collision.

In accordance with one aspect of the present disclosure, a method of a receiving user equipment is provided for performing transmission/reception through a sidelink (SL) with a transmitting user equipment. The method may include: distinguishing a type of coordination information for the transmitting user equipment; determining whether a transmission trigger condition of the coordination information is satisfied according to the type of the coordination information; and transmitting the coordination information when the transmission trigger condition is satisfied.

In accordance with the other aspect of the present disclosure, a method of a transmitting user equipment is provided for performing transmission/reception through a sidelink (SL) with a receiving user equipment. The method may include: distinguishing a type of coordination information between the user equipments; triggering transmission of the coordination information according to the type of the coordination information; and receiving the coordination information.

In accordance with another aspect of the present disclosure, a receiving user equipment is provided for performing transmission/reception through a sidelink (SL) with a transmitting user equipment. The receiving user equipment may include: a controller configured to distinguish a type of coordination information for the transmitting user equipment and determine whether a transmission trigger condition of the coordination information is satisfied according to the type of the coordination information; and a transmitter configured to transmit the coordination information when the transmission trigger condition is satisfied.

In accordance with further another aspect of the present disclosure, a transmitting user equipment is provided for performing transmission/reception through a sidelink (SL) with a receiving user equipment. The transmitting user equipment may include: a controller configured to distinguish a type of coordination information and trigger transmission of the coordination information according to the type of the coordination information, and a receiver configured to receive the coordination information.

In accordance with embodiments of the present disclosure, methods and apparatuses for transmitting and receiving the coordination information for the sidelink communication in the NR may efficiently use radio resources for the sidelink communication without collision.

DESCRIPTION OF DRAWINGS

The above and other aspects, features, and advantages of the present disclosure will be more apparent from the following detailed description taken in conjunction with the accompanying drawings, in which:

FIGS. 11A and 11B are illustrates a type of a V2X transmission resource pool;

DETAILED DESCRIPTION

Figure 1:
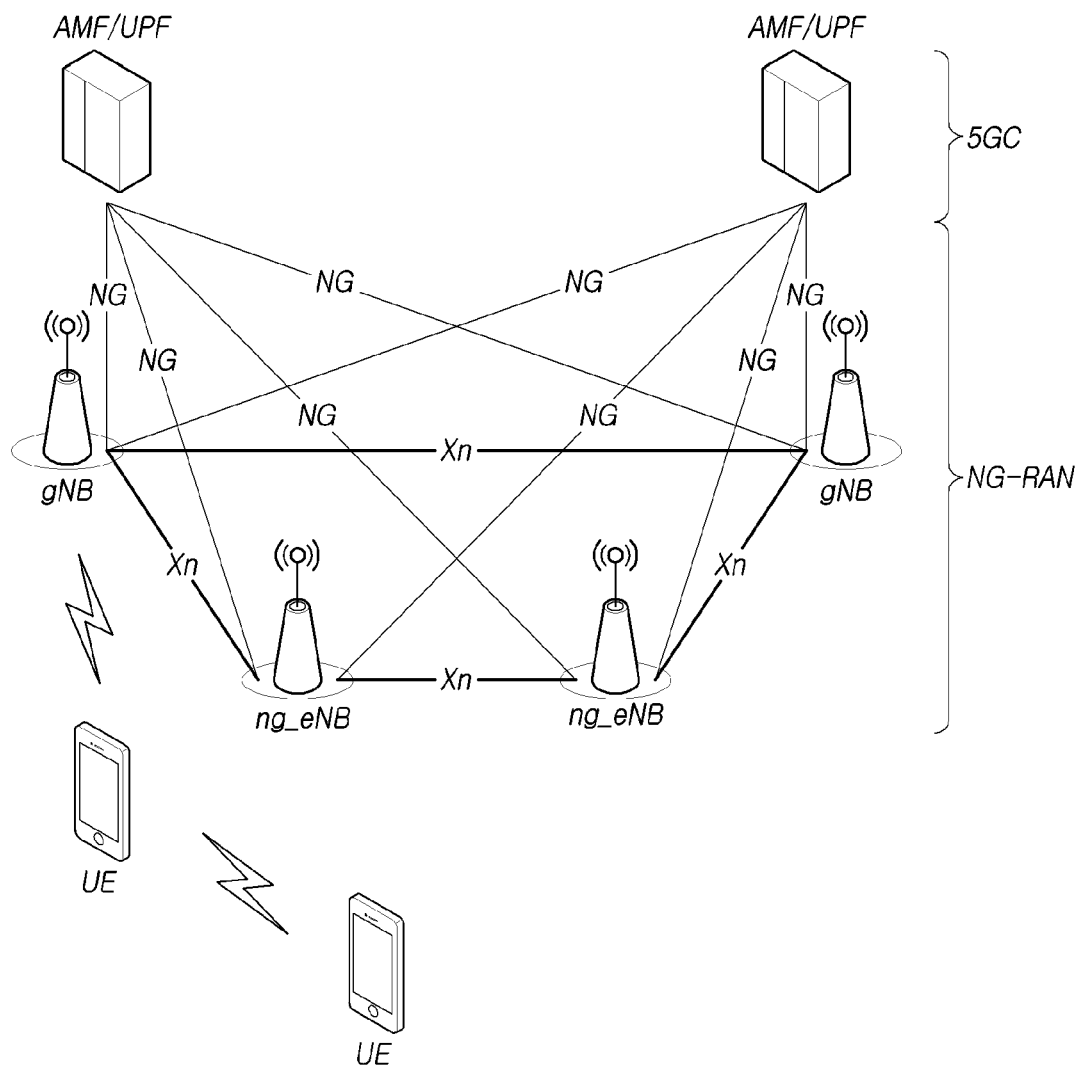
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from another UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
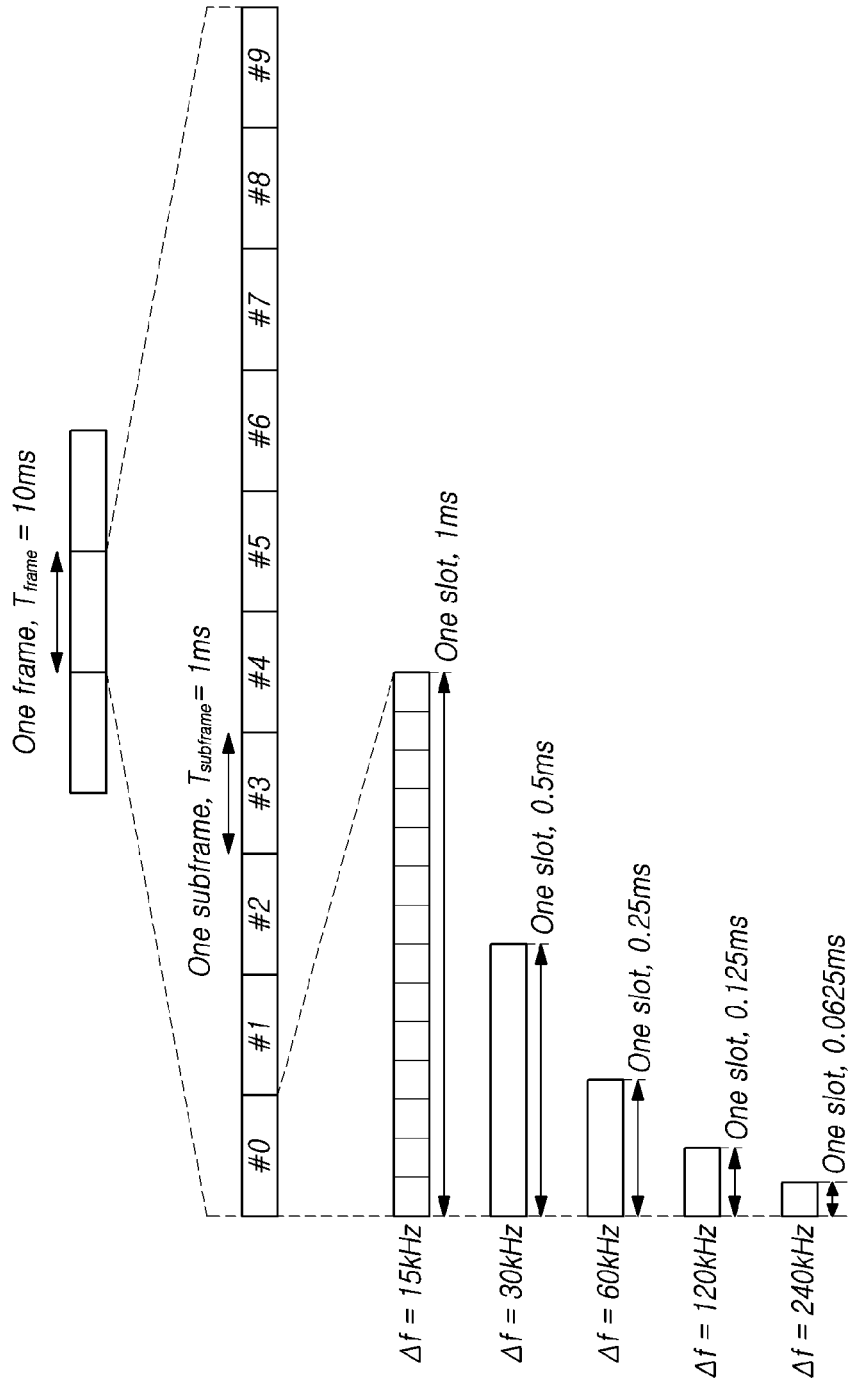
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
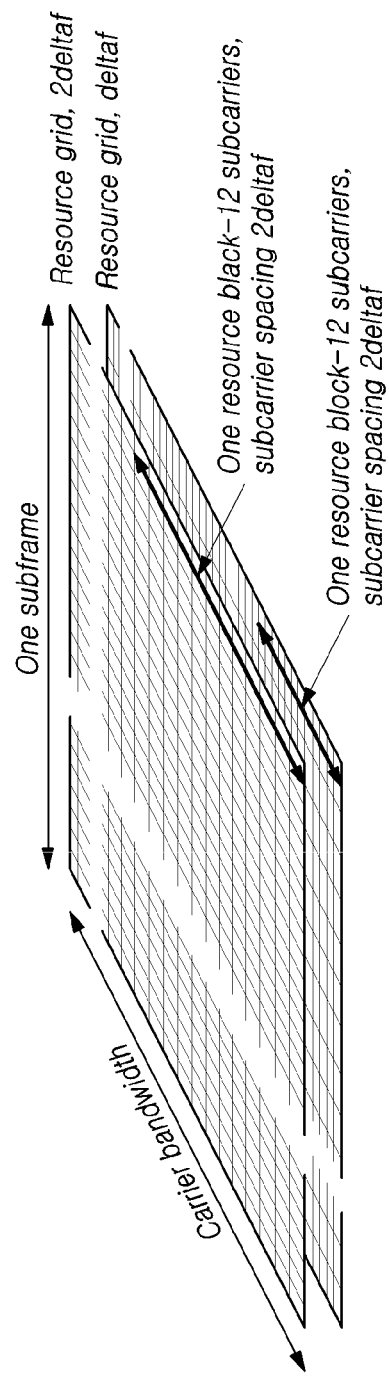
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
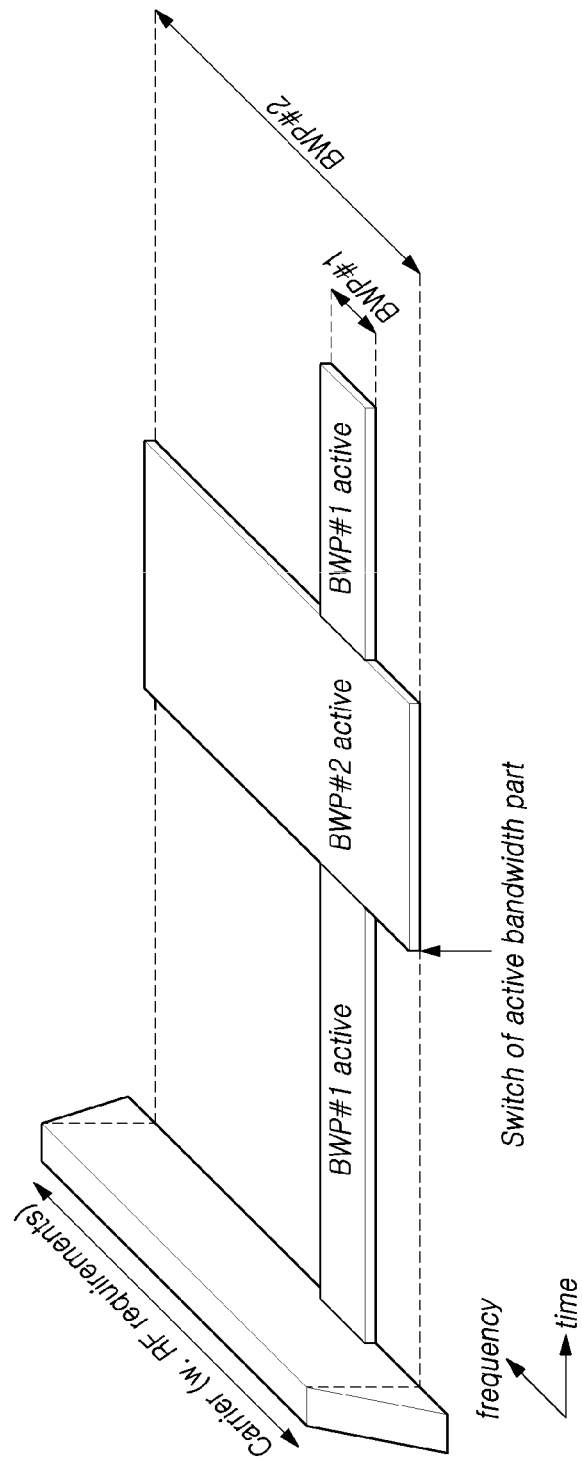
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
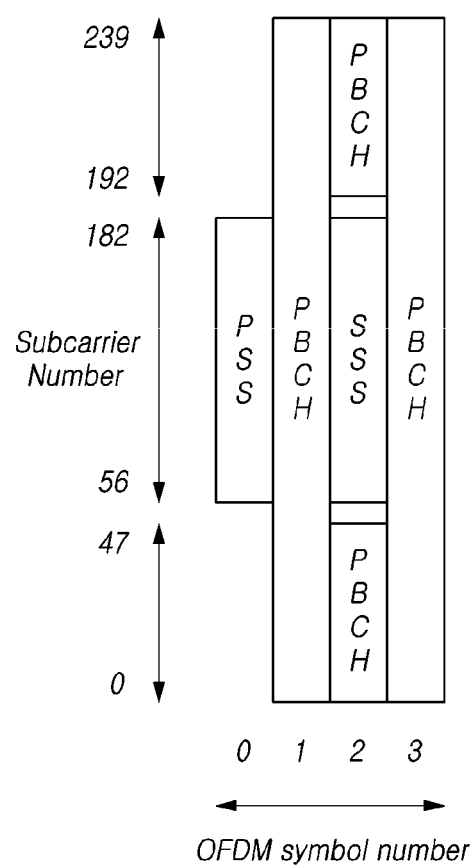
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
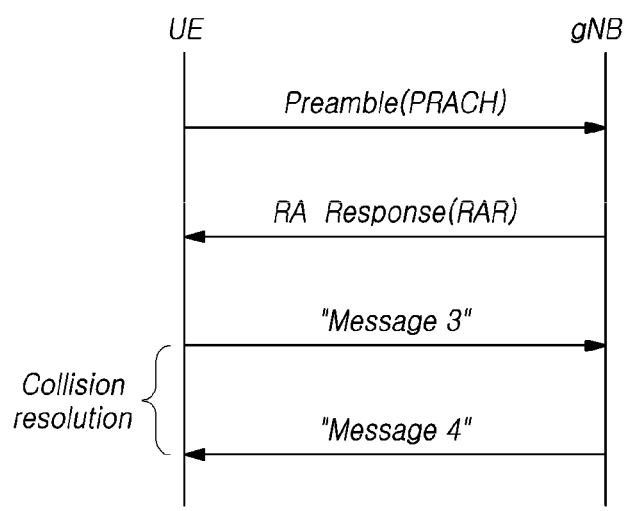
FIG. 6 is a signal diagram for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
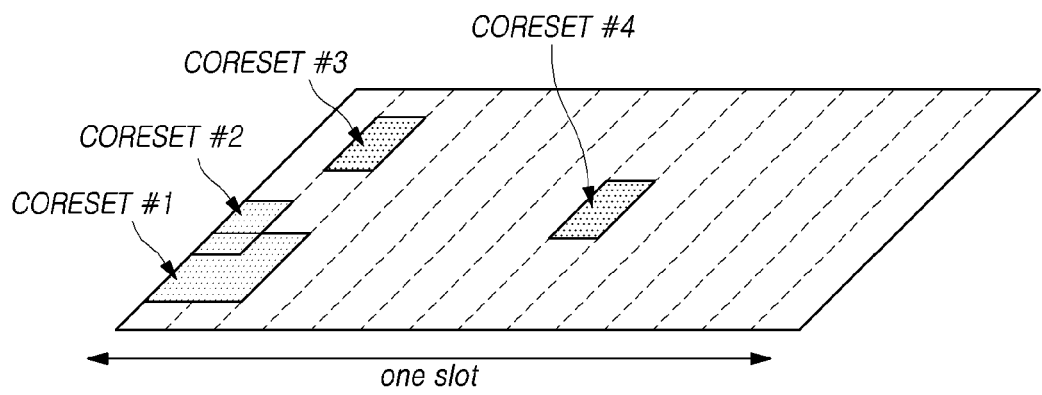
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

<LTE Sidelink>

In the LTE system, for providing device-to-device communication and vehicle-to-everything (V2X) (in particular, vehicle-to-vehicle (V2V)) service, designs for a radio channel and a radio protocol for direct communication (i.e. sidelink) between devices have been developed.

With respect to the sidelink, a synchronization signal (PSSS/SSSS) for synchronizing between a radio sidelink transmission end and a radio sidelink reception end, and a physical sidelink broadcasting channel (PSBCH) for transmitting/receiving a sidelink master information block (MIB) related to this have been defined. Further, designs have been conducted on a physical sidelink discovery channel (PSDCH) for transmitting/receiving discovery information, a physical sidelink control channel (PSCCH) for transmitting/receiving sidelink control information (SCI), and a physical sidelink shared channel (PSSCH) for transmitting/receiving sidelink data.

In order to assign a radio resource for the sidelink, two modes have been developed, i.e. i) mode 1 in which a base station assigns a radio resource and ii) mode 2 in which a UE selects and assigns a radio resource from a radio resource pool. Further, in order to satisfy the V2X scenario in the LTE system, a related technology has been required to be developed additionally.

In such an environment, the 3GPP have derived 27 service scenarios related to vehicle recognition/detection in Rel-14, and determined key performance requirements according to road conditions. In addition, the 3GPP have derived 25 service scenarios, such as vehicle platooning, advanced driving, remote driving, an extended sensor, or the like, evolved from Rel-14, and determined 6 performance requirements in Rel-15.

In order to satisfy such performance requirements, developments have been conducted for improving the performance of the sidelink technology developed based on the typical D2D communication to meet requirements of the V2X. In particular, in order to apply to the C-V2X (Cellular-V2X), a technology for improving a design of the physical layer of the sidelink to be adapted to a high-speed environment, a resource assignment technology, a synchronization technology may be selected as further study items.

The sidelink described below means a link used in D2D communication after Rel-12 of the 3GPP and V2X communication after Rel-14, and the terms for each channel, synchronization signal, and resource are described using equal terms without differently being defined according to requirements of the D2D communication, requirements of the V2X communication in Rel-14 and Rel-15. This is for convenience of description and ease of understanding, and when needed, embodiments will be described by focusing on a difference of the sidelink satisfying V2X scenario requirements relative to the sidelink for the D2D communication in Rel-12/13. Accordingly, the terms related to the sidelink discussed below are classified into D2D communication, V2X communication, and C-V2X communication for merely comparison between them and ease of understanding; therefore, such terms are not limited to a specific scenario.

<Resource Assignment>

Figure 8:
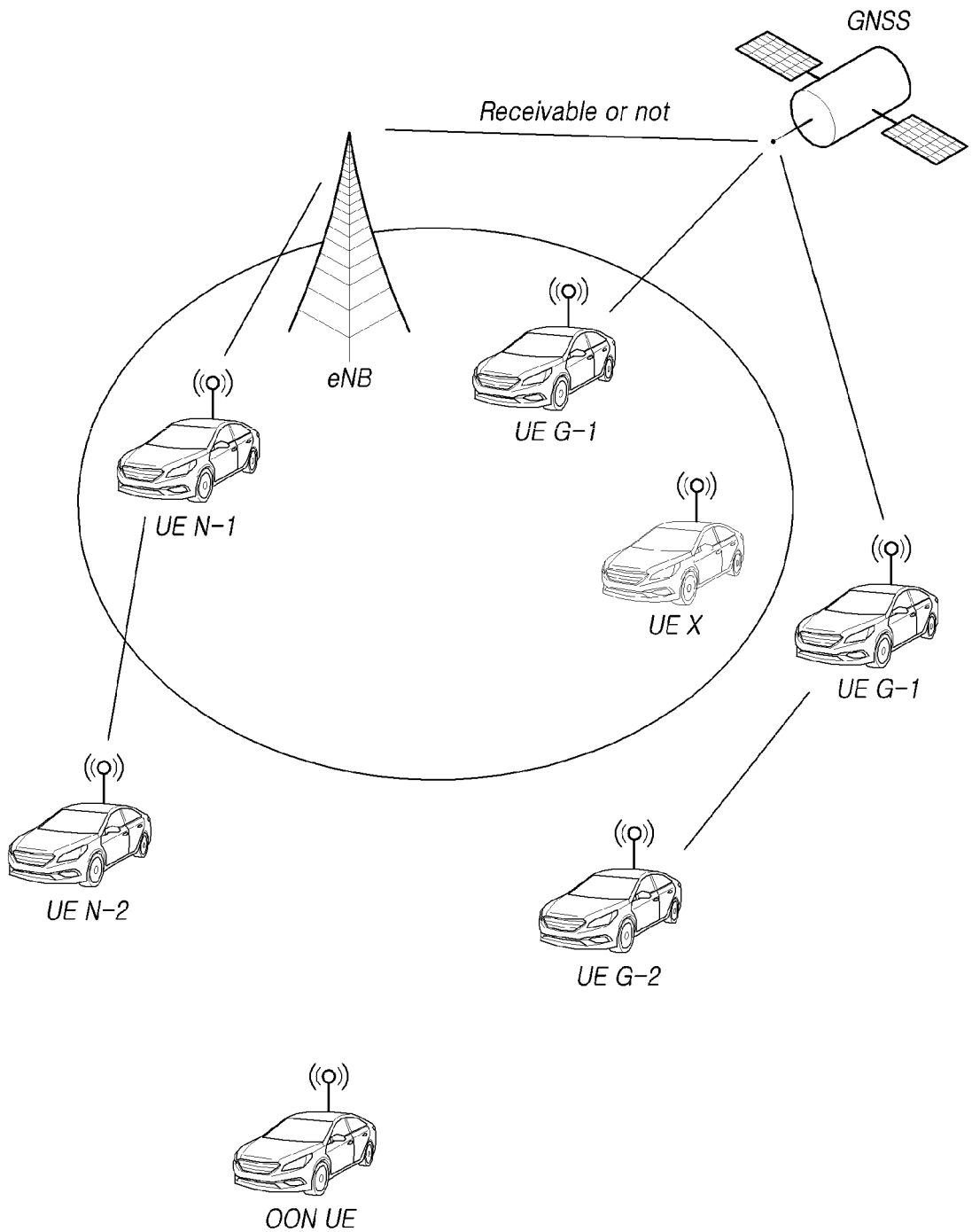
FIG. 8 is a view for explaining various scenarios for V2X communication.

FIG. 8 illustrates various scenarios for V2X communication.

Referring to FIG. 8, a V2X device (represented to a vehicle; however, may be replaced with other devices, such as a user equipment (UE), etc.) may be located in coverage of a base station (an eNB, a gNB, or an ng-eNB), or located outside of coverage of the base station. For example, communication may be performed between UEs (e.g., UE N-1, UE G-1, UE X) in coverage of the base station, or communication may be performed between a UE in coverage of the base station and a UE (e.g., UE N-1, UE N-2) outside of coverage of the base station. Alternatively, communication may be performed between UEs (e.g., UE G-1, UE G-2) out of coverage of the base station.

In such various scenarios, it is necessary to assign a radio resource for enabling a corresponding UE to perform communication using the sidelink. The assignment of the radio resource includes a method of a base station for handling the assignment of the radio resource and a method of a UE on its own selects and assigns the radio resource.

Specifically, in the D2D, for enabling a UE to assign a resource, two modes are defined, that is, i) a centralized mode (mode 1) in which a base station intervenes in the selection and management of the resource, and ii) a distributed mode (mode 2) in which a UE selects randomly one or more of pre-configured resources. Similar to the D2D, other modes are defined, such as, iii) a third mode (mode 3) in which a base station intervenes in the selection and management of the resource in the C-V2X, and iv) a fourth mode (mode 4) in which a vehicle directly selects a resource in the V2X. In the third mode (mode 3), a base station provides a schedule of a scheduling assignment (SA) pool resource area and a data pool resource area assigned to this to a transmitter UE.

Figure 9A:
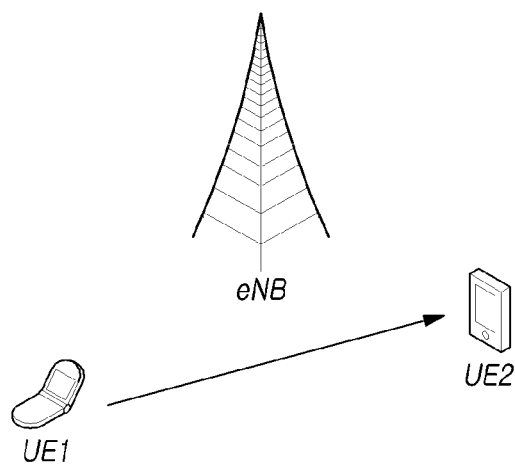
FIG. 9A is a view illustrating a first UE (UE1) and a second UE (UE2) performing sidelink communication.
Figure 9B:
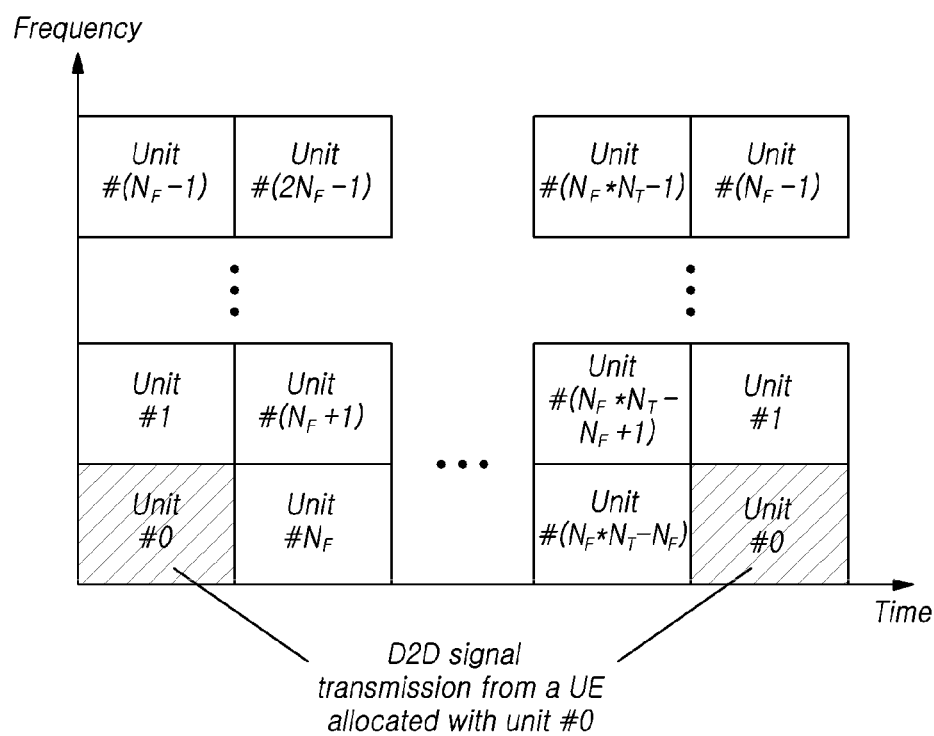
FIG. 9B is a view illustrating an example of resource pools for UEs.

FIG. 9A illustrates a first user equipment (UE1) and a second user equipment (UE2) performing sidelink communication, and FIG. 9B illustrates an example of resource pools used by the UEs.

Referring to FIG. 9, a base station is represented as an eNB; however, may be a gNB or an ng-eNB as described above. Further, the UEs are represented as mobile terminals; however, vehicles, infrastructures, or the like may be applied variously depending on scenarios or situations.

In FIG. 9A, the transmitter UE (UE 1) may select a resource unit corresponding to a specific resource within a resource pool including a set of resources, and transmit a sidelink signal using the resource unit. The receiver UE (UE 2) may be configured with a resource pool over which the UE 1 is allowed to transmit a signal, and detect a transmission signal from the UE 1.

If the UE 1 is in coverage of the base station, that is, available to receive services or signals from the base station, the base station may provide the resource pool to the UE 1. If the UE 1 is out of coverage of the base station, that is, unavailable to receive services or signals from the base station, the resource pool may be determined as one or more resources which are pre-configured or provided by another UE. Normally, the resource pool is made up of a plurality of resource units, and each UE may select one or more resource units and use the selected resource unit(s) for transmitting a sidelink signal.

Referring to FIG. 9B, the entire frequency resource is divided into NF frequency resources, and the entire time resource is divided into NT time resources. Thus, a total of NF*NT resource units can be defined. In this case, it is possible to express that a corresponding resource pool is repeated at a period of NT subframes. In particular, one resource unit may be configured to be provided periodically and repeatedly, as illustrated in FIG. 9B.

The resource pool may be classified into several types according to a certain criterion. For example, the resource pool may be classified into several types according to contents of a sidelink signal transmitted over each resource pool. As one example, the contents of the sidelink signal may be classified, and a separate resource pool may be configured for each of the contents. Scheduling assignment (SA), a sidelink channel, a discovery channel, or the like may be examples of the contents of the sidelink signal.

The SA may be a signal including information, such as, a location of a resource used to transmit a subsequent sidelink data channel by a transmitter UE, a modulation and coding scheme (MCS) that is needed to demodulate a data channel, a MIMO transmission scheme, timing advance (TA), or the like. This signal may be transmitted by being multiplexed with sidelink data over an identical resource unit as well. In this case, the SA resource pool may mean a pool of resources over which the SA is transmitted by being multiplexed with the sidelink data.

An FDM scheme applied to the V2X communication may lead a time delay until a data resource is assigned after a SA resource has been assigned to be reduced. For example, it is possible to consider a non-adjacent scheme in which a control channel resource and a data channel resource are split in time domain in one subframe, an adjacent scheme in which a control channel and a data channel are consecutively assigned in one subframe, or the like.

When the sidelink data along with the SA are multiplexed and transmitted over an identical resource unit, a sidelink data channel only in a different form from SA information may be transmitted over a resource pool for the sidelink data channel. In other words, resource elements used to transmit SA information over one or more individual resource units within a SA resource pool may be used still for transmitting sidelink data in a sidelink data channel resource pool. The discovery channel may be a resource pool for a message for enabling a transmitter UE to transmit information, such as an ID of the transmitter UE, or the like, and a neighboring UE to discover the transmitter UE. Even when contents of the sidelink signal are equal, different resource pools may be used according to transmission and/or reception characteristics of the sidelink signal.

For example, in even the case of an identical sidelink data channel or a discovery message, a different resource pool may be used according to a method of determining a transmission timing of a sidelink signal (e.g., whether the sidelink signal is transmitted at the time of receiving a synchronization reference signal or transmitted by applying a certain TA from the time of receiving the synchronization reference signal) or a method of assigning a resource (e.g., whether a base station dedicates a resource for transmitting a signal to a transmitter UE or whether a transmitter UE on its own selects a resource for transmitting a signal in a pool), a signal format (e.g., the number of symbols occupied by each sidelink signal in one subframe, the number of subframes used for transmitting one sidelink signal), a signal strength of from a base station, a transmission power strength of a sidelink UE, or the like.

<Synchronization Signal>

As described above, a V2X communication UE may be located out of coverage of a base station. In even this situation, it is necessary for communication using the sidelink to be performed. To do this, it is important for a UE located out of coverage of the base station to achieve synchronization.

Hereinafter, a method of achieving time and frequency synchronization in sidelink communication, particularly in communication between vehicles, between a vehicle and a UE, or between a vehicle and a communication network will be described based on the description above.

The D2D communication utilizes a sidelink synchronization signal (SLSS), which is a synchronization signal transmitted from a base station for time synchronization between UEs. In the C-V2X, a satellite system (the Global Navigation Satellite System (GNSS)) may be additionally considered for enhancing synchronization performance. In this case, priority may be given to synchronization establishment or a base station may indicate information on priority. For example, when determining its transmission synchronization, a UE selects a synchronization signal directly transmitted from a base station as a highest priority, and, when the UE is out of coverage of the base station, synchronizes with the SLSS transmitted from another UE in coverage of the base station as a higher priority.

Since a wireless terminal (hereinafter, for convenience of description, may be referred to as the UE as well) installed in a vehicle, or a UE mounted in the vehicle has a less problem with battery consumption and can use a satellite signal such as the GPS for navigation purposes, the satellite signal may be used for configuring time or frequency synchronization between UEs. The satellite signal may include, as well as the Global Positioning System (GPS), the GLObal NAvigation Satellite System (GLONAS), GALILEO, BEIDOU, or the like.

The sidelink synchronization signal may include a primary sidelink synchronization signal (PSSS), a secondary sidelink synchronization signal (SSSS), or the like. The PSSS may include a Zadoff-chu sequence with a pre-configured length, a structure similar to the PSS, a structure changed from the PSS, or a structure in which the PSS is repeated. Unlike a DL PSS, a different Zadoff-chu root index (e.g. 26, 37) may be used. The SSSS may include an M-sequence, a structure similar to the SSS, a structure changed from the SSS, or a structure in which the SSS is repeated. In a situation where UEs synchronize with a base station, the SRN is served as the base station, and the SLSS is served as the PSS or the SSS.

Unlike the PSS/SSS of DL, the PSSS/SSSS uses an UL subcarrier mapping method. A physical sidelink synchronization channel (PSSCH) may be a channel for transmitting system information (e.g., information related to the SLSS, a duplex mode (DM), a TDD UL/DL configuration, information related to a resource pool, types of applications related to the SLSS, a subframe offset, broadcast information, or the like) which is basic information that the UE is required to identify first before transmitting/receiving a sidelink signal. The PSSCH may be transmitted over a subframe identical or subsequent to the SLSS. The DM-RS may be used for demodulation of the PSSCH.

The SRN may be a node for transmitting the SLSS, or the PSSCH. The SLSS may be in the form of a specific sequence, and the PSSCH may be a sequence representing specific information or in the form of a codeword after pre-defined channel coding has been performed. Here, a base station or a specific sidelink UE may be served as the SRN. A UE may be served as the SRN in the case of partial network coverage or out-of-network-coverage.

When needed, the SLSS may be relayed, for example, through multi-hop, for sidelink communication with an out-of-coverage UE. Relaying a synchronization signal in description below includes, as well as directly relaying a synchronization signal of a base station, transmitting a sidelink synchronization signal in a separate format at the time of receiving the synchronization signal. Like this, since the sidelink synchronization signal is relayed, direct communication between an in-coverage UE and an out-of-coverage UE may be performed.

<Nr Sidelink>

As described above, unlike the V2X based on the LTE system, NR-based V2X technology is required to be developed for satisfying complex requirements as in autonomous driving.

In accordance with embodiments of the present disclosure, it is possible to provide a flexible V2X service in more diverse environments by applying a frame structure, numerology, a channel transmission/reception procedure, or the like of the NR to the NR V2X. To this end, it is necessary to develop technologies, such as, a resource sharing technology between a base station and a UE, a sidelink carrier aggregation technology (CA), a partial sensing technology for a UE held by a pedestrian, a short transmission time interval (sTTI), or the like.

In the NR V2X, it has been determined to support unicast or groupcast, as well as broadcast used in the LTE V2X. In this case, it also has been determined to use a target group ID for the unicast or the groupcast, and but it has been determined to discuss later whether to use a source ID.

Further, as it has been determined to support HARQ for QOS, it has been determined that a HARQ process ID is included in control information. In the LTE HARQ, a PUCCH for the HARQ is transmitted after 4 subframes after DL has been transmitted. In the NR HARQ, for feedback timing, a PUCCH resource and a feedback timing may be indicated using a PUCCH resource indicator in DCI format 1_0 or 1_1 PUCCH or a HARQ feedback timing indicator in response to the PDSCH (PDSCH-to-HARQ feedback timing indicator).

Figure 10:
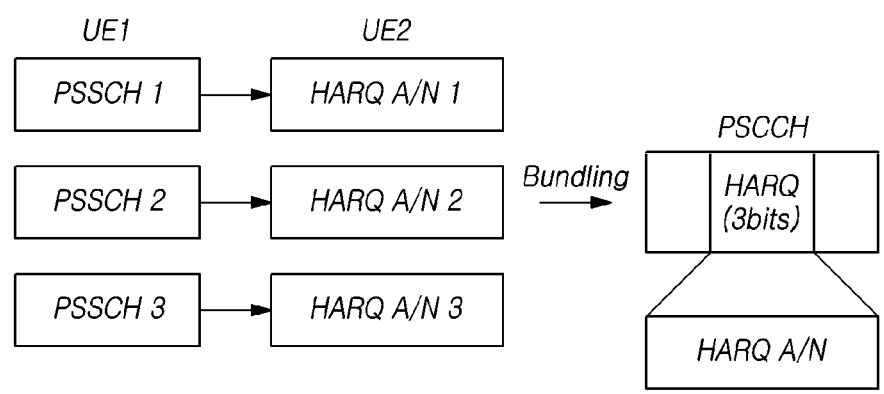
FIG. 10 is a view for explaining a method of bundling and transmitting HARQ feedback information in the V2X.

FIG. 10 illustrates a method of bundling and transmitting HARQ feedback information in the V2X.

Referring to FIG. 10, in the LTE V2X, separate HARQ ACK/NACK information is not transmitted in order to reduce system overhead, and data are allowed to be retransmitted once according to discretion of a transmitter UE for data transmission safety. However, in the NR V2X, in terms of data transmission stability, HARQ ACK/NACK information may be transmitted. In this case, overhead may be reduced by bundling and transmitting the corresponding information.

That is, when a transmitter UE UE1 transmits three data transmissions to a receiver UE UE2, and then the receiver UE generates HARQ ACK/NACK information in response to the transmissions, this may be bundled and transmitted over a PSCCH. FIG. 10 illustrates that HARQ ACK/NACK is transmitted over the PSCCH. However, the HARQ ACK/NACK may be transmitted over a separate channel or another channel, and the bundled HARQ information may be configured with 3 bits or less.

In frequency range 1 (FR1) for a frequency range of 3 GHz or less, 15 kHz, 30 kHz, 60 kHz, and 120 kHz have been discussed as a candidate subcarrier spacing (SCS). In frequency range 2 (FR2) for a frequency range exceeding 3 GHz, 30 kHz, 60 kHz, 120 kHz, and 240 kHz have been discussed as a candidate subcarrier spacing (SCS). In the NR V2X, a minislot (e.g., 2/4/7 symbols) smaller than 14 symbols may be supported as a unit of minimum scheduling.

The DM-RS, the PT-RS, the CSI-RS, the SRS, and the AGC training signal have been discussed as a candidate of the RS.

Synchronization Mechanism

NR V2X sidelink synchronization may include one or more sidelink synchronization signals and the PSBCH, and a sidelink source may include a UE in addition to the GNSS, and/or the gNB.

Resource Assignment

At least two sidelink resource allocation modes, i.e. mode 3 and mode 4, may by defined for NR V2X sidelink communication. In mode 3, a base station schedules one or more sidelink resources used by a UE for sidelink transmission. In mode 4, a UE determines one or more resources within one or more sidelink resources configured by a base station or one or more pre-configured sidelink resources.

Mode 4 may cover the following resource assignment sub-modes. That is, UE may automatically select a sidelink resource for transmission, help to select a sidelink resource for other UE(s), be configured with grant configured for sidelink transmission, or schedule the sidelink transmission of other UE(s).

V2X Resource Pool (Sensing and Selection Windows)

A V2X UE may transmit a message (or a channel) over a pre-defined (or signaled) resource pool. The resource pool may mean a set of one or more resources pre-defined for enabling the UE to perform the V2X operation (or in the UE capable of performing the V2X operation). In this case, the resource pool may be defined in terms of time-frequency. The V2X transmission resource pool may be defined as various types.

Figure 11A:
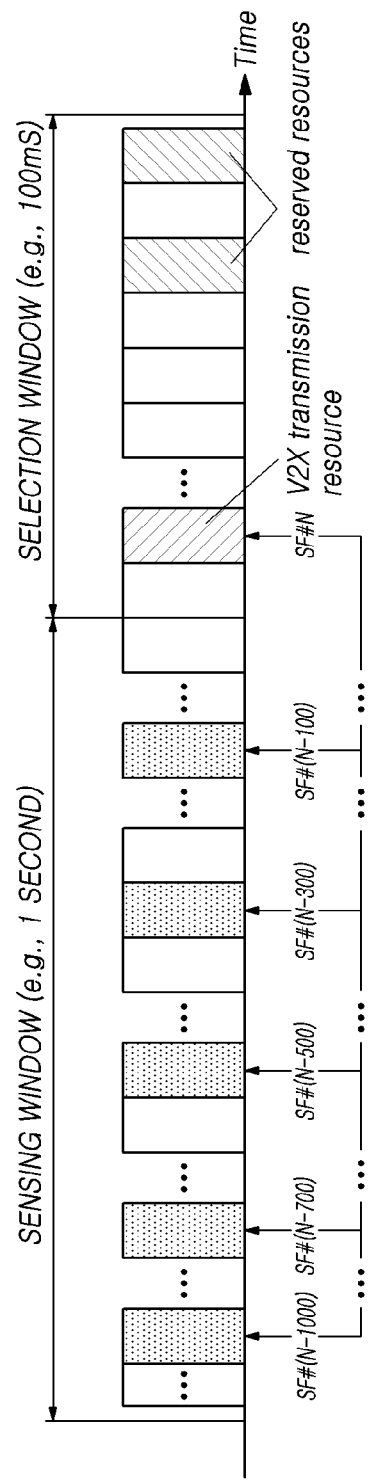

FIGS. 11A and 11B illustrate a type of a V2X transmission resource pool.

Referring to FIG. 11A, V2X transmission resource pool #A may be a resource pool over that allows partial sensing only. A V2X transmission resource selected by the partial sensing is remained semi-statically at a regular interval.

Referring to FIG. 11B, V2X transmission resource pool #B may be a resource pool over that allows a random selection only. In V2X transmit resource pool #B, a UE does not perform partial sensing, and may randomly select a V2X transmission resource in a selection window.

As one example, unlike a resource pool over which partial sensing only is allowed, in a resource pool over which the random selection only is allowed, a selected resource may be configured/signaled not to be semi-statically reserved. In order for a UE to perform a V2X message transmission operation over a V2X transmission resource pool, a base station may cause the UE not to perform a sensing operation (based on scheduling assignment decoding/energy measurement).

Although not illustrated in FIGS. 11A and 11B, a resource pool over allowing both the partial sensing and the random selection may be used as well. A base station may notify a UE that a V2X resource may be selected by either of the partial sensing and the random selection.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR(New Radio)

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

Figure 12:
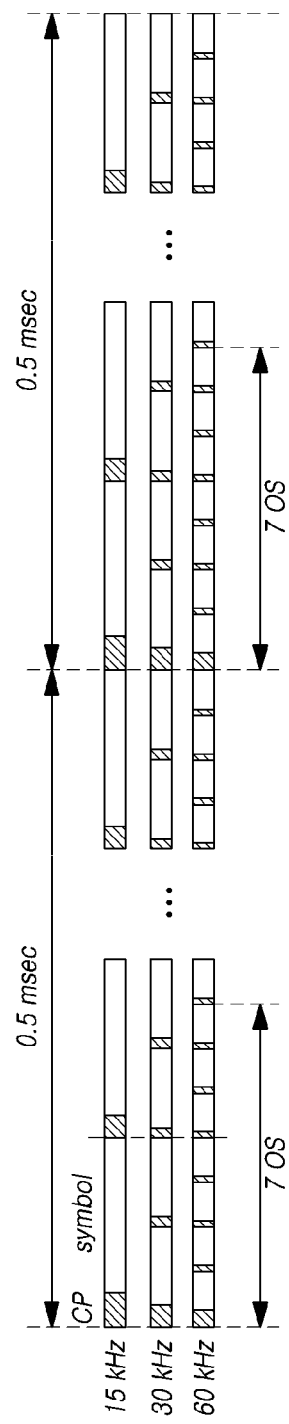
FIG. 12 is a view illustrating an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 12, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

<Bandwidth Part; BWP>

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 13:
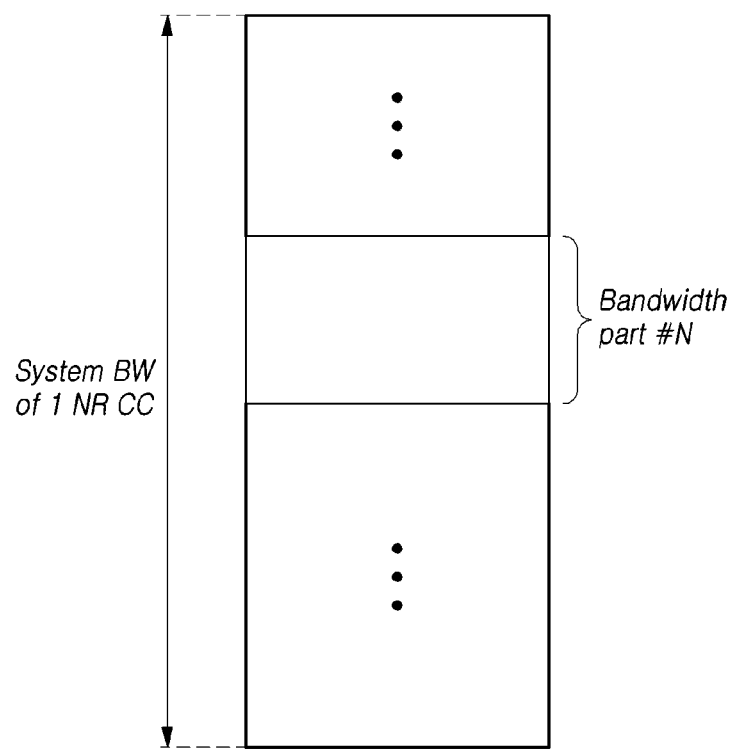
FIG. 13 is a view schematically illustrating a bandwidth part to which embodiments of the present disclosure may be applied.

However, the NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 13, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

<NR Sidelink>

In order to provide LTE and NR-based V2X service, a direct communication protocol was designed for direction communication between UEs based on LTE or NR framework. In particular, an NR sidelink-related radio communication protocol has been being designed for direct communication between NR-based UEs. The NR sidelink supports unicast and groupcast-based sidelink transmission in addition to the existing broadcast-based LTE sidelink transmission method. In addition, for this purpose, the NR sidelink supports HARQ operation and CSI-based link adaptation, and the like.

Accordingly, the following channels were additionally designed: i) PSFCH (Physical Sidelink Feedback Channel) for HARQ ACK/NACK feedback, which is sidelink feedback control information as well as related radio signals/channels designed in the existing LTE sidelink communication, that is, PSSS/SSSS, which is a synchronization signal for synchronization between a wireless sidelink transmitting end and a receiving end; ii) PSBCH (Physical Sidelink Broadcasting Channel) for transmitting and receiving a related sidelink MIB (Master Information Block); iii) PSCCH (Physical Sidelink Control Channel) for transmitting and receiving SCI (Sidelink Control Information) including sidelink scheduling control information; and iv) PSSCH (Physical Sidelink Shared Channel) for transmitting and receiving sidelink data. In addition, various HARQ ACK/NACK feedback methods based on unicast and groupcast were defined.

Since subcarrier spacing (SCS) of the OFDM communication system is changed in the NR, it is also required to change the frame structure of the sidelink to be used for information transmission and reception in the sidelink communication.

In the embodiments of the present disclosure, the sidelink signal may use a CP-OFDM type waveform between the CP-OFDM type and the DFT-s-OFDM type. In addition, the sidelink may use the following subcarrier spacing (hereinafter, SCS). For example, in FR (frequency range) 1, which uses a frequency band of less than 6 GHz, SCS of 15 kHz, 30 kHz, and 60 kHz is used, and in this case, it may be set to mainly use the 60 kHz interval showing the best performance. In FR 2, which uses a frequency band of 6 GHz or higher, 60 kHz and 120 kHz intervals are used, and the 60 kHz band may be mainly used.

In addition, the sidelink uses a cyclic prefix (CP) to prevent modulation from occurring during wireless communication transmission/reception, and its length may be set equal to the normal CP length of the NR Uu interface. If necessary, an extended CP may be applied.

In addition, the sidelink communication may be performed, when a plurality of vehicles performs group driving. In this case, radio resources for the sidelink communication may frequently collide to each other. In particular, a sidelink Mode 2 requires an adjust procedure for preventing resource collision unlike a sidelink Mode 1. Here, the sidelink Mode 1 allows the base station to allocate and schedule sidelink communication resources, and the sidelink Mode 2 allows the terminal to select a sidelink communication resource based on a sensing operation within a certain resource pool.

Hereinafter, a method of transmitting and receiving coordination information for sidelink communication will be described with reference to related drawings.

In the present disclosure, a receiving terminal (Rx UE) means a terminal that receives a PSCCH and a corresponding PSSCH through a sidelink. In addition, a transmitting terminal (Tx UE) means a terminal transmitting the PSCCH and the corresponding PSSCH through the sidelink.

In addition, in the present disclosure, the coordination information means information transmitted to solve a problem caused by overlapping radio resources in the sidelink communication. However, embodiments of the present disclosure are not limited thereto. For example, adjustment information or assistance information may be used to have the same meaning as the coordinate information.

Figure 14:
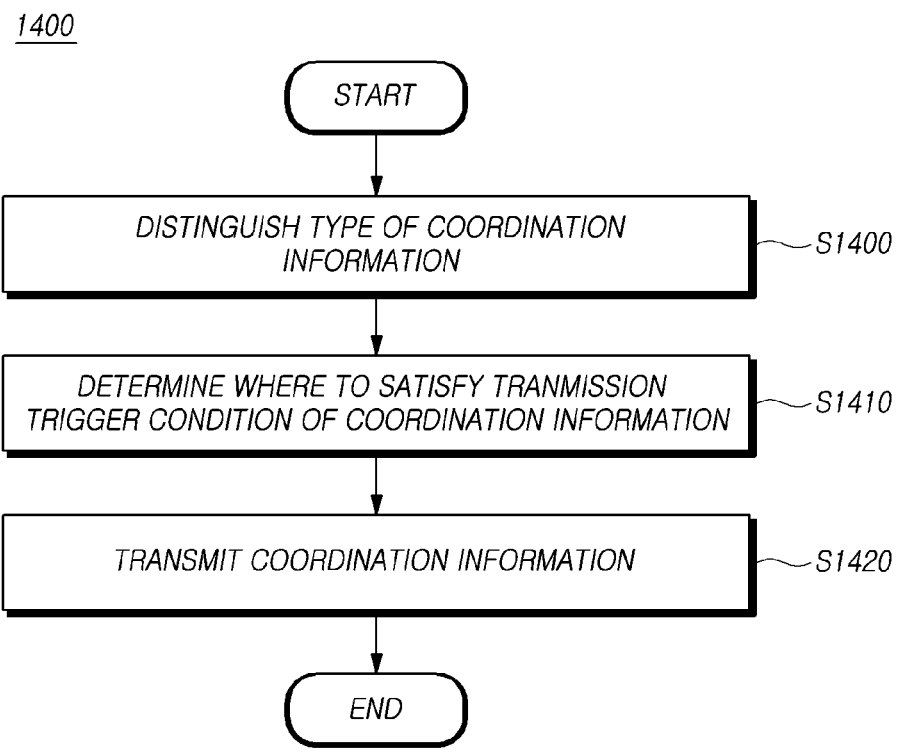
FIG. 14 is a flowchart illustrating a procedure in which a receiving UE transmits coordination information according to an embodiment.
Figure 16:
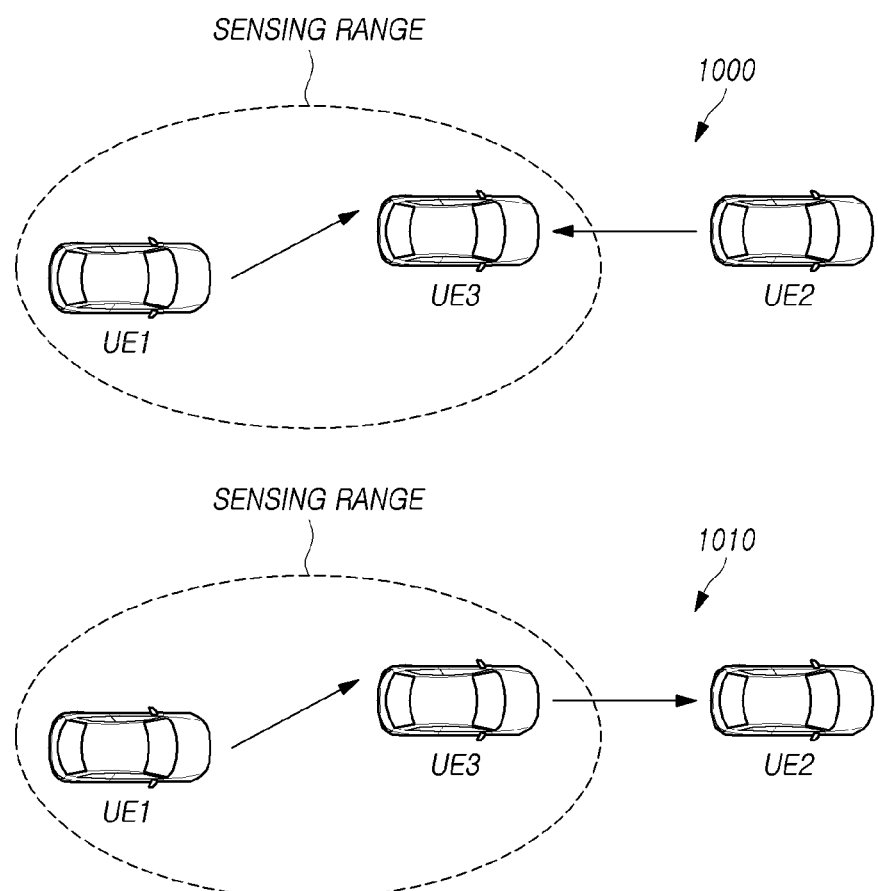
FIG. 16 is a diagram for explaining an operation of transmitting and receiving coordination information in sidelink communication according to the present embodiment.

FIG. 14 is a flowchart illustrating a procedure of a receiving UE for transmitting coordination information according to an embodiment. FIG. 16 is a diagram for explaining an operation of transmitting and receiving coordination information in sidelink communication according to the present embodiment.

Referring to FIG. 14, in a method 1400 of a receiving user equipment (UE) of performing transmission/reception through a sidelink (SL) with a transmitting UE, the receiving UE may distinguish a type of coordination information between the UEs for the transmitting UE at S1400.

As described above, since each UE performs communication by allocating resources in the sidelink mode 2, resources may be overlapped. In this case, it is necessary to coordinate or adjust resource allocation by sharing allocated resource information between UEs. That is, referring to FIG. 16, coordination between UEs may be required through transmission and reception of the coordination information in the sidelink communication.

For example, as in the situation 1000 of FIG. 16 in the sidelink mode 2, UE1 and UE2 are outside the sensing range for radio resource selection, respectively, so that the same radio resource may be selected for the sidelink transmission to UE3. In this case, a collision does not occur in radio resource selection and data transmission, respectively, from the viewpoints of UE1 and UE2. However, since UE3 receives sidelink data from UE1 and UE2 through the same radio resource, a resource collision occurs. In order to solve this hidden node problem, an inter-UE coordination procedure may be required.

Alternatively, as in situation 1010 of FIG. 16, UE1 may transmit the sidelink data to UE3, and UE3 may also transmit the sidelink data to UE2. In this case, if UE1 and UE3 select the same sidelink radio resource, UE3 may not receive data transmitted by UE1 due to collision. In order to solve such a half duplex problem, an inter-UE coordination procedure may be required.

In this way, when an inter-UE coordination procedure is required, the receiving UE may enable transmission/reception of coordination information between the UEs at S1400. In this case, as an example, it is assumed that the receiving UE and the transmitting UE support the use of the coordination information between the UEs. Reversely, the receiving UE may disable transmission/reception of coordination information between the UEs.

However, as another example, it may be requested to confirm whether the receiving UE and the transmitting UE each support the use of coordination information between UEs. In this case, the method according to the present disclosure may further include, by the receiving UE, transmitting capability information for the coordination information to the transmitting UE, and receiving the capability information for the coordination information from the transmitting UE.

That is, whether the coordination information is supported for each UE may be transmitted between the base station and the UE through capability signaling. Specifically, the capability information may be information related to whether transmission/reception is supported for the coordination information or the type or format of the supported coordination information.

When the receiving UE and the transmitting UE are UEs supporting transmission/reception of the coordination information, the transmission/reception of the coordination information for the sidelink communication may be enabled or disabled as S1400. As an example, the receiving UE may determine whether to enable the transmission/reception of the coordination information based on a cast type of the sidelink transmission such as unicast, groupcast and broadcast.

Alternatively, the enabling transmission and reception of the coordination information at S1400 is explicitly configured through higher layer signaling or sidelink control information or is configured implicitly by a pre-configuration. As an example, the receiving UE may determine whether to enable the transmission/reception of the coordination information based on explicit signaling. For example, whether to enable the transmission/reception of the coordination information may be configured through higher layer signaling such as RRC signaling. Alternatively, whether to enable the transmission/reception of the coordination information may be indicated through the sidelink control information. Alternatively, whether to enable transmission and reception of coordination information may be implicitly configured according to a pre-configuration, such as whether a specific SCI format is used.

The receiving UE may receive sidelink reservation resource information including radio resource information selected for sidelink transmission from the transmitting UE. The sidelink reservation resource information may be transmitted in the sidelink control information. The sidelink control information is transmitted through the PSCCH and the PSSCH. The sidelink reservation resource information may be transmitted through at least one channel among the PSCCH and the PSSCH. The receiving UE may configure the coordination information based on the received reservation resource information from the transmitting UE.

The type of coordination information includes a first type including a preferred resource set or a non-preferred resource set for the transmitting UE, and a second type including resource conflict information for the transmitting UE. That is, when the receiving UE configures and transmits the coordination information, it may distinguish or identify the first type of the coordination information including of a preferred resource set or a non-preferred resource set and the second type of the coordination information including resource conflict information such as resource conflict indication information.

Referring back to FIG. 14, in the method 1400 of the receiving UE of performing transmission/reception through the sidelink (SL) with the transmitting UE, the receiving UE may determine whether a transmission trigger condition of the coordination information is satisfied according to the type of the coordination information at S1410.

As an example, the transmission trigger condition of the coordination information includes the reception of explicit reporting request information from the transmitting user equipment in the case of the first type. The receiving UE may determine that the transmission trigger condition of the coordination information is satisfied when it receives the explicit reporting request information from the transmitting U. Then, the receiving UE may configure the first type of the coordination information. The receiving UE may configure the coordination information when the request information for requesting the coordination information is received from the transmitting UE. The request information from the transmitting UE may be received by being included in the sidelink control information. In this case, the receiving UE may configure the coordination information including information on a preferred resource set or a non-preferred resource set.

As an example, the coordination information including information on the preferred resource set or the non-preferred resource set may be configured based on a reference signals received power (RSRP) value for another transmitting UE identified or confirmed by the receiving UE. The receiving UE may select preferred resource set information based on the sidelink reservation resource information of another transmitting UE. Specifically, the sidelink reservation resource information having an RSRP measurement value greater than a pre-configured threshold among the sidelink reservation resource information reserved by at least one other transmitting UE may be configured to be excluded from the selected at least one radio resource included in the preferred resource set information.

To this end, the receiving UE may measure RSRP for at least one radio resource included in the sidelink reservation resource information received from at least another transmitting UE, respectively. The receiving UE compares the RSRP value measured for each of at least one radio resource with a pre-configured RSRP threshold. Thereafter, the receiving UE configures the coordination information not to include, among the reserved resources of other transmitting UEs, the reserved resource exceeding the threshold in the preferred resource set information. This is because the possibility of collision with the use of the transmitting UE due to a distance, blockage, etc. is low. in the case of measuring the RSRP measurement value below a certain level, even if the radio resource overlaps with another transmitting UE, the possibility of collision with the use of the transmitting UE due to distance, blockage, etc. is low.

Alternatively, the receiving UE may select non-preferred resource set information based on the sidelink reservation resource information of another transmitting UE. Specifically, the non-preferred resource set information includes at least one radio resource determined based on the sidelink reservation resource information reserved by at least one other transmitting UE that the receiving UE receives and the RSRP measurement value measured by the receiving UE. For example, the non-preferred resource set information may be determined based on an RSRP measurement value for at least one radio resource included in the sidelink reservation resource information reserved by another transmitting UE.

Similar to the preferred resource set information, for a reserved resource having the RSRP measurement value above a certain level, the receiving UE may configure it as the coordination information. Alternatively, the receiving UE may include both i) the reserved resource reserved by another transmitting UE and ii) the radio resource having the RSRP measurement value measured by the receiving UE in the non-preferred resource set information.

As another example, the transmission trigger condition of the coordination information includes detection of overlapping in the time domain or frequency domain between resource allocation to another transmitting user equipment and resource allocation to the transmitting UE identified by the receiving user equipment in the case of the second type. The receiving UE may configure the second type of the coordination information including collision information when the radio resource indicated by the sidelink reservation resource information transmitted by the transmitting UE partially or fully overlaps with the sidelink reservation resource information reserved by at least one other transmitting UE received by the receiving UE.

The receiving UE may determine whether the reserved resources of the transmitting UE overlap with the reserved resources of another transmitting UE by using the sidelink reservation resource information transmitted by the transmitting UE and the sidelink reservation resource information transmitted by another UE. The receiving UE determine when they partially or fully overlap with each other, it may configure the second type of the coordination information including the resource collision information indicating whether collision of the sidelink reservation resource information transmitted by the transmitting UE occurs.

Alternatively, the receiving UE may configure the coordination information according to the comparison result between the sidelink reservation resource information transmitted by the transmitting UE and the sidelink radio resource already used by another transmitting UE for communication. That is, when the reserved resource of the transmitting UE and the radio resource used by another transmitting UE partially or fully overlaps with each other, the receiving UE may configure the coordination information.

Referring back to FIG. 14, in the method 1400 of the receiving UE of performing transmission/reception through the sidelink (SL) with the transmitting UE, the receiving UE may transmit the coordination information when the transmission trigger condition is satisfied at S1420.

As an example, the receiving UE may transmit the configured coordination information according to the type of the coordination information using at least one of a sidelink control channel such as the PSCCH, a sidelink data channel such as the PSSCH, and a sidelink feedback channel such as the PSFCH. For example, the first type coordination information about the preferred resource set or the non-preferred resource set may be transmitted through at least one channel of the PSCCH and the PSSCH. In contrast, the second type coordination information regarding the resource collision information may be transmitted through the PSFCH.

The receiving UE may transmit the coordination information according to whether the transmission trigger condition of the coordination information is satisfied. As described above, the transmission trigger condition may be configured to be satisfied when the explicit reporting request information is received from the transmitting UE. The transmission trigger condition of the coordination information may be also configured to be satisfied when a pre-configured transmission period arrives. In this case, the coordination information may be configured to include preferred resource set information or non-preferred resource set information.

Alternatively, the transmission trigger condition may be configured to be satisfied when the overlapping in the time domain or frequency domain between resource allocation to another transmitting UE and resource allocation to the transmitting UE identified or confirmed by the receiving UE is detected. In this case, the coordination information may be configured to include the resource collision information.

The method 1400 of the receiving user equipment (UE) of performing transmission/reception through the sidelink (SL) with the transmitting UE further includes: receiving resource reallocation information for sidelink transmission configured based on the transmitted coordination information and a sensing result of the transmitting UE. The transmitting UE may select or reselect the radio resource for the sidelink communication based on the received coordination information.

As an example, the transmitting UE may select or reselect the sidelink resource based on the coordination information and the sensing result sensed in the sensing window as described in FIG. 11. The sensing window means a time period for each UE to select the radio resource to perform the sidelink communication. Each UE selects or reselects a specific radio resource in the resource pool by using the value of the radio resource sensing result sensed in the sensing window. Accordingly, the transmitting UE may select or reselect the radio resource by using at least one of preferred resource set or non-preferred resource set information included in the received coordination information and resource information selected as the sensing result.

When the preferred resource set information is included in the coordination information, the transmitting UE may select or reselect, as the sidelink resource, the radio resource commonly included in the resource information according to the sensing result and the preferred resource set information. For example, the transmitting UE may preferentially select or reselect the resource commonly included in resource information according to the sensing result performed before or after reception of the coordination information and the preference resource set information included in the coordination information.

Alternatively, when the preferred resource set information is included in the coordination information, the transmitting UE may select or reselect the sidelink resource from among radio resources included in the preferred resource set information without considering a sensing result. That is, the transmitting UE may select or reselect the sidelink resource only from radio resources included in the preferred resource set information, without using the sensing result sensed by itself.

Alternatively, when the non-preferred resource set information is included in the coordination information, the transmitting UE may select or reselect the sidelink resource from the resource information according to the sensing result except for the radio resource included in the non-preferred resource set information. When the resource information according to the sensing result sensed in the sensing window overlaps the radio resource included in the non-preferred resource set information, the transmitting UE may select or reselect the radio resource from the resource information according to the remaining sensing result except for the overlapped resource.

When the resource collision information is included in the coordination information, the transmitting UE may perform a radio resource reselection operation based on the received resource collision information. After then, the receiving UE may receive the resource reallocation information for the selected and reselected resource.

Accordingly, in the NR sidelink communication, when the mode 2-based sidelink resource allocation method is applied, the method 1400 for transmitting and receiving the coordination information for the sidelink communication may be capable of avoiding sidelink transmission resource collision between UEs.

Figure 15:
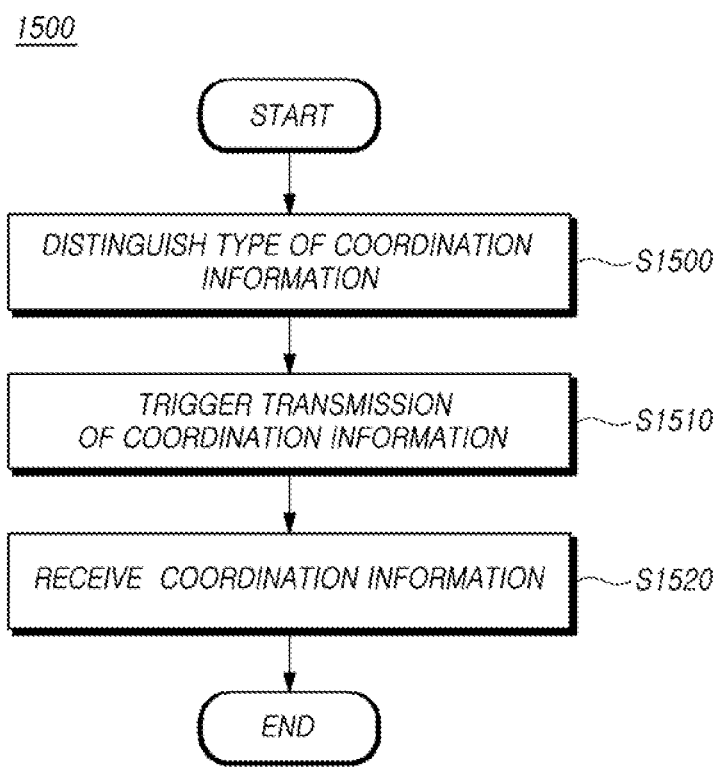
FIG. 15 is a flowchart illustrating a procedure in which a transmitting UE receives coordination information according to an embodiment.

FIG. 15 is a flowchart illustrating a procedure of a transmitting UE for receiving coordination information according to an embodiment.

Referring to FIG. 15, in a method 1500 of the transmitting UE of performing transmission/reception through the sidelink (SL) with the receiving UE, the transmitting UE may distinguish a type of coordination information between the UEs.

When an inter-UE coordination procedure is required as described above in FIG. 16, the transmitting UE may enable transmission/reception of the coordination information between the UEs at S1500. In this case, as an example, it is assumed that the receiving UE and the transmitting UE support the use of the coordination information between the UEs. Reversely, the transmitting UE may disable transmission/reception of the coordination information between the UEs.

However, as another example, it may be requested to confirm whether the receiving UE and the transmitting UE each support the use of coordination information between UEs. In this case, the method 1500 according to the present disclosure may further include, by the transmitting UE, transmitting capability information for the coordination information to the receiving UE, and receiving the capability information for the coordination information from the receiving UE.

That is, whether the coordination information is supported for each UE may be transmitted between the base station and the UE through capability signaling. Specifically, the capability information may be information related to whether transmission/reception is supported for the coordination information or the type or format of the supported coordination information.

When the receiving UE and the transmitting UE are UEs supporting transmission/reception of the coordination information, the transmission/reception of the coordination information for the sidelink communication may be enabled or disabled as S1500. As an example, the transmitting UE may determine whether to enable the transmission/reception of the coordination information based on a cast type of the sidelink transmission such as unicast, groupcast and broadcast.

Alternatively, the enabling transmission and reception of the coordination information at S1500 is explicitly configured through higher layer signaling or sidelink control information or is configured implicitly by a pre-configuration. As an example, the transmitting UE may determine whether to enable the transmission/reception of the coordination information based on explicit signaling. For example, whether to enable the transmission/reception of the coordination information may be configured through higher layer signaling such as RRC signaling. Alternatively, whether to enable the transmission/reception of the coordination information may be indicated through the sidelink control information. Alternatively, whether to enable transmission and reception of coordination information may be implicitly configured according to a pre-configuration, such as whether a specific SCI format is used.

The transmitting UE may transmit the sidelink reservation resource information including radio resource information selected for the sidelink transmission from the transmitting UE. The sidelink reservation resource information may be transmitted in the sidelink control information. The sidelink control information is transmitted through the PSCCH and the PSSCH. The sidelink reservation resource information may be transmitted through at least one channel of the PSCCH and the PSSCH. The receiving UE may configure the coordination information based on the reserved resource information received from the transmitting UE.

The type of coordination information includes a first type including the preferred resource set or the non-preferred resource set for the transmitting UE, and a second type including resource conflict information for the transmitting UE. That is, when the transmitting terminal receives the coordination information, the transmitting terminal may distinguish the first type of the coordination information including a preferred resource set or a non-preferred resource set and the second type of the coordination information including the resource conflict information such as the resource conflict indication information.

Referring back to FIG. 15, in the method 1500 of the transmitting UE of performing transmission/reception through the sidelink (SL) with the transmitting UE, the transmitting UE may trigger transmission of the coordination information according to the type of the coordination information at S1510.

As an example, the transmission trigger condition of the coordination information includes reception of explicit reporting request information from the transmitting user equipment in the case of the first type. The receiving UE may determine that the transmission trigger condition of the coordination information is satisfied when the receiving UE receives the explicit reporting request information from the transmitting UE. Then the receiving UE may configure the first type of the coordination information. That is, the transmitting UE may trigger the transmission of the coordination information through transmission of the explicit reporting request information. The transmitting UE may transmit the request information through the sidelink control information. In this case, the receiving UE may configure the coordination information including a preferred resource set or a non-preferred resource set.

As an example, the coordination information including a preferred resource set or a non-preferred resource set may be configured based on a reference signals received power (RSRP) value for another transmitting UE identified or confirmed by the receiving UE. The receiving UE may select preferred resource set information based on the sidelink reservation resource information of another transmitting UE. Specifically, the sidelink reservation resource information having an RSRP measurement value greater than a pre-configured threshold among the sidelink reservation resource information reserved by at least one other transmitting UE may be configured to be excluded from the selected at least one radio resource included in the preferred resource set information.

To this end, the receiving UE may measure RSRP for at least one radio resource included in the sidelink reservation resource information received from at least another transmitting UE, respectively. The receiving UE compares the RSRP value measured for each of at least one radio resource with a pre-configured RSRP threshold. Thereafter, the receiving UE configures the coordination information not to include, among the reserved resources of another transmitting UEs, the reserved resource exceeding the threshold in the preferred resource set information. This is because, the possibility of collision with the user of the transmitting UE due to distance or blockage is low in the case of measuring the RSRP measurement value below a certain level, even if the radio resource overlaps with another transmitting UE.

Alternatively, the receiving UE may select non-preferred resource set information based on the sidelink reservation resource information of another transmitting UE. Specifically, the non-preferred resource set information includes at least one radio resource determined based on the sidelink reservation resource information reserved by at least one other transmitting UE that the receiving UE receives and the RSRP measurement value measured by the receiving UE. For example, the non-preferred resource set information may be determined based on an RSRP measurement value for at least one radio resource included in the sidelink reservation resource information reserved by another transmitting UE.

Similar to the preferred resource set information, for a reserved resource having the RSRP measurement value above a certain level, the receiving UE may configure it as the coordination information. Alternatively, the receiving UE may include both i) the reserved resource reserved by another transmitting UE and ii) the radio resource having the RSRP measurement value measured by the receiving UE higher than a predetermined level in the non-preferred resource set information.

As another example, the transmission trigger condition of the coordination information includes detection of overlapping in the time domain or frequency domain between resource allocation to another transmitting UE and resource allocation to the transmitting UE identified by the receiving UE in the case of the second type. That is, an overlap detection event may correspond to the transmission trigger condition. The receiving UE may configure the second type of the coordination information including collision information when the radio resource indicated by the sidelink reservation resource information transmitted by the transmitting UE partially or fully overlaps with the sidelink reservation resource information reserved by at least one other transmitting UE received by the receiving UE.

The receiving UE may determine whether the reserved resources of the transmitting UE and another transmitting UE overlap by using the sidelink reservation resource information transmitted by the transmitting UE and the sidelink reservation resource information transmitted by the another transmitting UE. When they partially or fully overlaps with each other, the receiving UE may configure the second type of the coordination information including the resource collision information indicating whether collision of the sidelink reservation resource information transmitted by the transmitting UE occurs.

Alternatively, the receiving UE may configure the coordination information according to the comparison result between the sidelink reservation resource information transmitted by the transmitting UE and the sidelink radio resource already used by another transmitting UE for communication. That is, when the reserved resource of the transmitting UE and the radio resource used by another transmitting UE partially or fully overlaps with each other, the transmitting UE may configure the coordination information.

Referring back to FIG. 15, in the method 1500 of the transmitting UE of performing transmission/reception through the sidelink (SL) with the transmitting UE, the transmitting UE may receive the coordination information at S1520.

As an example, the transmitting UE may receive the configured coordination information according to the type of the coordination information using at least one of a sidelink control channel such as the PSCCH, a sidelink data channel such as the PSSCH, or a sidelink feedback channel such as the PSFCH. For example, the first type coordination information about the preferred resource or the non-preferred resource set may be received through at least one channel of the PSCCH and the PSSCH. In contrast, the second type coordination information regarding the resource collision information may be received through the PSFCH.

The transmitting UE may receive the coordination information the coordination information according to whether the transmission trigger condition of the coordination information is satisfied. As described above, the transmission trigger condition may be configured to be satisfied when the explicit reporting request information is received from the transmitting UE. Further, the transmission trigger condition of the coordination information may be configured to be satisfied when a pre-configured transmission period arrives. In this case, the coordination information may be configured to include preferred resource set information or non-preferred resource set information.

Alternatively, the transmission trigger condition may be configured to be satisfied when the overlapping in the time domain or frequency domain between resource allocation to another transmitting UE and resource allocation to the transmitting UE identified or confirmed by the receiving UE is detected. In this case, the coordination information may be configured to include the resource collision information.

The method 1500 of the transmitting UE of performing the transmission/reception through the sidelink (SL) with the transmitting UE further includes: transmitting resource reallocation information for sidelink transmission configured based on the transmitted coordination information and a sensing result of the transmitting UE. The transmitting UE may select or reselect the radio resource for the sidelink communication based on the received coordination information.

As an example, the transmitting UE may select or reselect the sidelink resource based on the coordination information and the sensing result sensed in the sensing window as described in FIG. 11. The transmitting UE may select or reselect the radio resource by using at least one of preferred resource set or non-preferred resource set information included in the received coordination information and resource information selected as the sensing result.

When the preferred resource set information is included in the coordination information, the transmitting UE may select or reselect, as the sidelink resource, the radio resource commonly included in the resource information according to the sensing result and the preferred resource set information. Alternatively, when the preferred resource set information is included in the coordination information, the transmitting UE may select or reselect the sidelink resource from among radio resources included in the preferred resource set information without considering a sensing result.

Alternatively, when the non-preferred resource set information is included in the coordination information, the transmitting UE may select or reselect the sidelink resource from the resource information according to the sensing result except for the radio resource included in the non-preferred resource set information. When the resource information according to the sensing result sensed in the sensing window overlaps the radio resource included in the non-preferred resource set information, the transmitting UE may select or reselect the radio resource from the resource information according to the remaining sensing result except for the overlapped resource.

When the resource collision information is included in the coordination information, the transmitting UE may perform a radio resource reselection operation based on the received resource collision information. After then, the transmitting UE may transmit the resource reallocation information for the selected and reselected resource.

According to this, in the NR sidelink communication, when the mode 2-based sidelink resource allocation method is applied, the method 1500 for transmitting and receiving the coordination information for the sidelink communication may be capable of avoiding sidelink transmission resource collision between UEs.

Hereinafter, each embodiment related to transmission and reception of the coordination information for the sidelink communication in the NR will be described in detail with reference to related drawings.

In the mode 2-based sidelink radio resource allocation method, a sidelink transmitting UE (e.g., sidelink Tx UE) may select the radio resource for the sidelink transmission by itself based on the channel sensing result. That is, it is defined that the Tx UE may select any time resource (e.g., sidelink slot) for transmitting the PSCCH and the PSSCH to any receiving UE(s) (e.g., sidelink Rx UE(s)) and any frequency resource (e.g., sub-channel(s)) based on the channel sensing result in the corresponding Tx UE.

However, the sidelink radio resource selected based on only the sensing result for the Tx UE may be a radio resource with severe interference from the side of the Rx UE receiving the sidelink transmission from the corresponding Tx UE. That is, according to the hidden node problem as described above, the Tx UE may perform the sidelink transmission and reception through the radio resource with severe interference from the Rx UE side, which may cause degradation in terms of reliability and delay for the sidelink transmission and reception.

Accordingly, in the present disclosure, as a method for solving this problem, when the mode 2-based sidelink radio resource allocation method is applied, assistance information for selecting the sidelink radio resource between UEs may be configured and transmitted.

As the assistance information as the coordination information transmitted from a sidelink receiving UE (e.g., sidelink Rx UE) to a sidelink transmitting UE (e.g., sidelink Tx UE), there may be "a set of resources" or resource set information. The corresponding "a set of resources" may be preferred resource information configured based on the sensing result in the Rx UE. Alternatively, the corresponding "a set of resources" may be non-preferred radio resource information configured based on the sensing result of the Rx UE. Alternatively, as the assistance information, it may be indication information on the sidelink resource conflict. The resource conflict information may be pre-conflict indication information for a reserved resource, or post-conflict indication information for the sidelink transmission that has already occurred.

When various types/types of the assistance information are defined as described above, it is necessary to define which the types/types of the assistance information to be transmitted from the Rx UE to the Tx UE or to a third UE or the base station. That is, when one or more formats/types or types of the assistance information are defined, a method for determining the format/types or types of the assistance information to be transmitted from an arbitrary UE is proposed.

Embodiment 1: Capability and Enabling/Disabling of Assistance Information

Whether or not the above-described assistance information is supported for each UE may be defined to be transmitted between the base station and the UE through capability signaling. Specifically, the corresponding capability information may be information on whether transmission of the assistance information is supported, whether reception of the assistance information is supported, or type/format related information of the assistance information.

Whether transmission and reception of the assistance information between UEs supporting transmission and reception of arbitrary assistance information according to PSSCH transmission and reception or for PSSCH transmission and reception is supported may be enabled or disabled. As an example, whether the corresponding assistance information is supported or whether transmission and reception of the assistance information is enabled or disabled may be determined by a cast type of PSSCH transmission. For example, in the case of broadcast, the assistance information is not supported, that is, transmission of the assistance information is defined to be disabled. In case of the groupcast or the unicast, the assistance information may be defined to be enabled. As another example, it may be defined such that transmission and reception of the assistance information is disabled for the broadcast or the groupcast, and transmission and reception of the assistance information is enabled only for the unicast.

As another example, whether the corresponding assistance information is supported or whether transmission and reception of the assistance information is enabled or disabled may be determined by explicit signaling. For example, whether the corresponding assistance information is supported or whether transmission and reception of the assistance information is enabled or disabled is configured through RRC signaling, or enabling/disabling information of the corresponding assistance information may be indicated through the sidelink control information format (e.g., SCI format). Alternatively, whether the corresponding assistance information is supported or whether transmission and reception of the assistance information is enabled or disabled may be implicitly indicated. For example, a specific 1st-stage SCI format may be used for assistance information enabling, or a specific 2nd-stage SCI format may be used for assistance information enabling.

As another example, whether the corresponding assistance information is supported or whether transmission and reception of the assistance information is enabled or disabled may be configured for each sidelink cluster/coverage constituting the mode 2-based sidelink transmission/reception. For example, it may be defined that whether the corresponding assistance information is supported or whether transmission and reception of the assistance information is enabled or disabled is indicated through the PSBCH (Physical Sidelink Broadcast CHannel) transmitted from a sink constituting an arbitrary sidelink cluster/coverage and enabling/disabling information. Alternatively, when the sidelink synchronization signal (S-SS) is transmitted, it may be defined to implicitly include information on whether the corresponding assistance information is supported or whether transmission and reception of the assistance information is enabled or disabled.

As another example, whether the corresponding assistance information is supported or whether transmission and reception of the assistance information is enabled or disabled may be configured based on location information between UEs, that is, zone ID information based on a geodesic distance. Alternatively, whether the corresponding assistance information is supported or whether transmission and reception of the assistance information is enabled or disabled may be configured according to the inter-UE sidelink CSI information. As such, when the enabling/disabling is determined according to the location information or the inter-UE sidelink CSI information, an arbitrary threshold value serving as a reference value of the corresponding enabling/disabling may be configured/indicated through the RRC signaling or physical layer (L1) control signaling from the base station/network or the UE. (e.g., PDCCH or PSCCH, etc.).

Additionally, whether the corresponding assistance information is supported or whether transmission and reception of the assistance information is enabled or disabled may be made through a combination of two or more examples with respect to the above-described examples. For example, whether the corresponding assistance information is supported may be determined according to the cast type, and whether transmission and reception of the assistance information is enabled or disabled may be indicated through the above-described explicit signaling (e.g., RRC signaling or SCI format transmission) for the cast type additionally supporting the assistance information.

Embodiment 2: Determination of Type/Format of Assistance Information

When the assistance information is transmitted and received between UEs according to the method of Embodiment 1 or another method described above, it is necessary to determine the type/format of the corresponding assistance information. Hereinafter, a method for determining the type/format of the corresponding assistance information for assistance information transmission and reception is introduced.
Determination by Cast Type The type/format(s) of the assistance information may be defined to be determined for each cast type. That is, the type/format of the assistance information of the corresponding Rx UE may be determined according to the cast type of the PSSCH received by any Rx UE. That is, as an example, in the case of the broadcast, the assistance information is configured and transmitted as indication information for resource conflict. In the case of the groupcast, the set of non-preferred resources is configured and transmitted in configuring the set of resources. In the case of the unicast, it may be defined to configure and transmit the preferred resource set. However, the embodiment is not limited thereto, and all cases in the type/format of the assistance information is determined by the cast type may be included in the scope of the present disclosure.
Determination by Explicit or Implicit Signaling An UE or base station may configure or instruct the type/format of the assistance information by explicit or implicit signaling.

For example, a source node constituting a sidelink cluster may transmit type/format configuration information of the assistance information to be transmitted/received from/to sidelink UEs in the corresponding cluster through the S-SS or the PSBCH. Alternatively, the base station constituting a cell may configure the format/type of the assistance information for the mode-2 based sidelink UEs in the corresponding cell and transmit it through the cell-specific/UE-specific RRC signaling or the physical layer control signaling. Alternatively, any Tx UE may transmit the type/format configuration information of the assistance information through the PC5 RRC signaling. Alternatively, the type/format indication information of the assistance information may be included in the SCI format, and it may be transmitted through the PSCCH.

Alternatively, the type/format information of the assistance information may be implicitly indicated. For example, a specific 1st-stage SCI format may be used, or a specific 2nd-stage SCI format may be used to indicate the type/format information of the assistance information.
Definition of Triggering Condition for Each Type/Format of Assistance Information A separate triggering condition may be defined for each type/format of the assistance information described above, and when the corresponding triggering condition is satisfied, it may be defined to transmit the corresponding type/format of the assistance information. One or more of sidelink CSI information, the location information (e.g., zone ID), a sidelink resource for PSSCH transmission in the Tx UE, resource conflict on a sidelink resource reserved for PSSCH transmission, or an interference level with respect to the corresponding sidelink resource may be used as the triggering condition.

For example, in the Rx UE, when there is detected resource collision in which the PSSCH transmission resources of different Tx UEs according to PSCCH reception information are fully or partially overlapped in the time or frequency domain, the assistance information may be indication information for the corresponding resource conflict. Alternatively, when an interference level in a radio resource or a reserved radio resource in which the PSSCH transmission is performed in the Tx UE is higher than a specific threshold value, the corresponding assistance information may be preferred resource set configuration information or non-preferred resource set configuration information.

Additionally, all cases in which the type/format of the assistance information is determined in the form of all combinations of the above-described methods may be included in the scope of the present disclosure.

In addition, the present disclosure introduces a reporting procedure for each type/format of the assistance information as described above.

Embodiment 3: Reporting Procedure for Each Type/Format of Assistance Information In defining the reporting procedure for each type/format of the assistance information, as an example, the assistance information for indicating the resource conflict and the assistance information consisting of the preferred or non-preferred radio resource set information among the above-described assistance information are preferentially divided, and the reporting procedure may be separately performed.

That is, when an UE may configure and transmit or receives the assistance information, the assistance information including a preferred sidelink resource set or a non-preferred sidelink resource set may be defined as type-1 assistance information. On the other hand, the assistance information including the resource conflict indication information or high-interference indication information for the interference avoidance for the sidelink radio resource allocated for the PSSCH transmission in a Tx UE, which is a radio resource allocated or reserved for the PSSCH transmission by a SCI format transmission may be defined as separate type-2 assistance information.

That is, the sidelink assistance information may be classified into the type-1 assistance information including recommended resource set information for the sidelink transmission and the type-2 assistance information including the resource conflict indication or the resource reselection indication/request information thereof.

As such, when the assistance information is defined as a multi-type, a separate reporting procedure may be defined for each type of the assistance information.

As an example, there may be restricted the type of assistance information supported according to the sidelink cast type. For example, the type-1 assistance information may be applied to all cast types, and the type-2 assistance information may be applied only to the groupcast and the unicast.

As shown below, the Table 2 may define the supported cast type for each type of the assistance information. However, the content of the Table 2 below is an example of a mapping table for the supported cast type for each type of the assistance information but not limited thereto. All combinations including the cast type mapping table for each type of the assistance information may be included within the scope of the present invention.

TABLE 2

| Type of assistance information | Supported cast type |
|---|---|
| Type-1 assistance information | Broadcast, groupcast, unicast |
| Type-2 assistance information | unicast |

As another example, a reporting channel for the assistance information may be defined for each type of the assistance information. For example, in the case of the aforementioned type-1 assistance information, it may be defined to be transmitted through the PSCCH or the PSSCH. On the other hand, in the case of the aforementioned type-2 assistance information, it may be defined to be transmitted through the PSFCH. The above descriptions are only examples, and the embodiments are not limited thereto. For example, vice versa may also be applied to another embodiment.

As another example, a separate triggering procedure may be defined for each type of the above-described assistance information. For example, the type-1 assistance information may be triggered through the higher layer signaling or may be triggered or enabled through the SCI format.

Embodiment 4: Reporting and Triggering Procedures for Assistance Information

Reporting and triggering procedures for the assistance information may also be separately applied according to the type of the assistance information. As an example, the aforementioned type-1 assistance information may be defined to be configured through the higher layer signaling and reported periodically, or additionally reported when information modification is required after initial assistance information reporting. That is, when the type-1 assistance information reporting is configured for an UE, the corresponding UE may configure the preferred resource set or non-preferred resource set information and transmits it through the PSCCH or the PSSCH with a period, and the corresponding period information may be also configured through the higher layer signaling.

Alternatively, when the type-1 assistance information reporting is configured for a certain UE, the UE may configure the preferred resource set or non-preferred resource set information to perform the initial assistance information reporting. Thereafter, it may be defined to modify and report the preferred resource set or non-preferred resource set configuration information based on the change information only when changes occur in the preferred resource set or non-preferred resource set configuration information for the initial assistance information reporting.

Alternatively, the reporting of the corresponding type-1 assistance information may be requested by the SCI transmitted by any Tx UE. That is, any SCI format may be defined to include the indication information for requesting the corresponding assistance information, that is, assistance information request indication information. In this case, it may be defined to configure and report the type-1 assistance information in any Rx UE based on the corresponding indication information. In this case, whether or not the corresponding assistance information request indication information is included may be configured by the RRC signaling, and a separate SCI format including the information may be defined.

On the other hand, the type-2 assistance information may indicate triggering/request information for each SCI in which the PSSCH transmission is allocated. That is, in the case of the corresponding type-2 assistance information, its reporting may be made through the PSFCH or the PSCCH as the conflict indication information for any transmitted PSSCH or reserved PSSCH. Accordingly, during the SCI transmission for the corresponding PSSCH transmission allocation, the Tx UE may transmit the request indication information for the corresponding assistance information. In this case, whether the corresponding assistance information request indication information is included may be configured by the RRC signaling, and a separate SCI format including the information may be defined. In addition, in the case of the corresponding type-2 assistance information, it may be defined to be supported only when the HARQ operation is enabled. That is, when HARQ reporting is disabled for a Rx UE, the Rx UE may be defined not to expect a request/triggering for type-2 assistance information reporting.

Additionally, in applying the reporting procedure for each type of the assistance information suggested in the present disclosure, all combinations of the aforementioned reporting procedure and the type of the assistance information may be included in the scope of the present disclosure.

In addition, the present disclosure introduces a specific method for configuring the coordination information between UEs of scheme 1 as the type of inter-UE coordination information.

As described above, the inter-UE coordination information of the scheme 1 is transmitted to the transmitting UE by configuring the preferred resource set or the non-preferred resource set. Therefore, a specific definition of a resource pool defining the preferred resource set or the non-preferred resource set is required.

According to an example, a reference sidelink resource set serving as a reference for defining the preferred resource set or the non-preferred resource set may be configured. For example, the reference sidelink resource set including N sidelink slots and M subchannels may be configured. Based on this reference sidelink resource set, the receiving UE may configure and transmit the preferred resource set or the non-preferred resource set in a 2D bitmap method.

According to the above-described embodiments, in the NR sidelink communication, when the mode 2-based sidelink resource allocation method is applied, a method and apparatus for transmitting and receiving the coordination information for the sidelink communication may be capable of avoiding sidelink transmission resource collision between UEs.

Hereinafter, hardware and software configurations of the receiving UE and the transmitting UE capable of performing some or all of the embodiments described with reference to FIGS. 1 to 16 will be described with reference to the drawings. The above description may be omitted to avoid redundant description. In this case, the omitted content may be substantially identically applied to the following description unless it goes against the technical spirit of the present disclosure.

Figure 17:
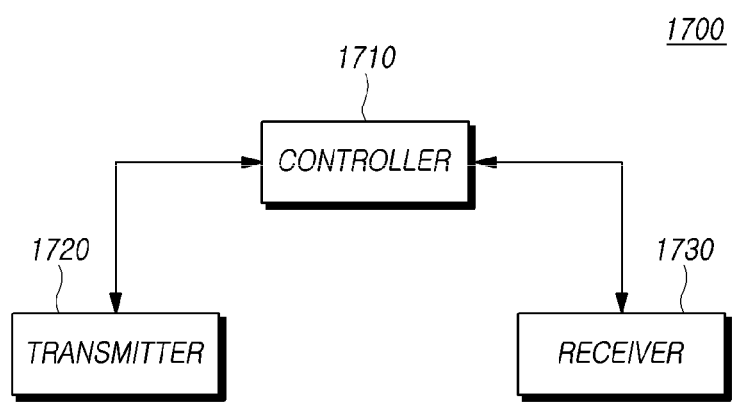
FIG. 17 is a diagram showing a receiving UE according to an embodiment of the present disclosure.

FIG. 17 is a diagram showing a receiving UE according to an embodiment of the present disclosure.

Referring to FIG. 17, a receiving UE 1700 according to an embodiment of the present disclosure includes a controller 1710, a transmitter 1720 and a receiver 1730. The receiver 1720 and the transmitter 1730 may be collectively referred to as a transceiver.

The controller 1710 controls overall operations of the receiving UE 1700 for performing transmission/reception of the coordination information through a sidelink (SL) with a transmitting UE in the next-generation radio access network according to the embodiments described above. The transmitter 1720 transmits uplink control information and data or messages to the base station via a corresponding channel, and uplink control information and data or messages to the transmitting UE or the sidelink scheduling UE via a corresponding channel. The receiver 1730 receives the downlink control information and data or messages to the base station via a corresponding channel, and uplink control information and data or messages to the transmitting UE or the sidelink scheduling UE via a corresponding channel.

The controller 1710 may distinguish a type of coordination information between the UEs for the transmitting UE. When an inter-UE coordination procedure is required as described above in FIG. 16, the controller 1710 may enable transmission/reception of coordination information between the UEs. In this case, as an example, it is assumed that the receiving UE and the transmitting UE support the use of the coordination information between the UEs. Reversely, the transmitting UE may disable transmission/reception of the coordination information between the UEs.

However, as another example, it may be requested to confirm whether the receiving UE and the transmitting UE each support the use of coordination information between UEs. In this case, the transmitter 1720 may transmit capability information for the coordination information to the transmitting UE, and the receiver 1730 may receive the capability information for the coordination information from the transmitting UE.

As an example, the controller 1710 may determine whether to enable the transmission/reception of the coordination information based on explicit signaling. For example, whether to enable the transmission/reception of the coordination information may be configured through higher layer signaling such as RRC signaling. Alternatively, whether to enable the transmission/reception of the coordination information may be indicated through the sidelink control information. Alternatively, whether to enable transmission and reception of coordination information may be implicitly configured according to a pre-configuration, such as whether a specific SCI format is used.

The type of coordination information includes a first type including information on a preferred resource set or a non-preferred resource set for the transmitting UE, and a second type including resource conflict information for the transmitting UE.

That is, when the receiving UE configures and transmits/receives the coordination information, the controller 1710 may distinguish or identify the first type of the coordination information including information on a preferred resource set or a non-preferred resource set and the second type of the coordination information including resource conflict information such as resource conflict indication information.

The controller 1710 may determine whether a transmission trigger condition of the coordination information is satisfied according to the type of the coordination information.

As an example, the transmission trigger condition of coordination information includes reception of explicit reporting request information from the transmitting user equipment in the case of the first type. The controller 1710 may determine that the transmission trigger condition of the coordination information is satisfied when the receiving UE receives the explicit reporting request information from the transmitting UE, and then configure the first type of the coordination information. The controller 1710 may configure the coordination information when the request information for requesting the coordination information is received from the transmitting UE. The request information from the transmitting UE may be received by being included in the sidelink control information. In this case, the controller 1710 may configure the coordination information including a preferred resource or a non-preferred resource set.

The controller 1710 may configure the coordination information based on the reserved resource information received from the transmitting UE. As an example, the controller 1710 may configure the coordination information when the request information for requesting the coordination information is received from the transmitting UE. The request information from the transmitting UE may be received by being included in the sidelink control information. In this case, the controller 1710 may configure the coordination information including a preferred resource or a non-preferred resource set.

As an example, the coordination information including information on a preferred resource set or a non-preferred resource set may be configured based on a reference signals received power (RSRP) value for another transmitting UE identified or confirmed by the controller 1710. The controller 1710 may select preferred resource set information based on the sidelink reservation resource information of another transmitting UE. Specifically, the sidelink reservation resource information having an RSRP measurement value greater than a pre-configured threshold among the sidelink reservation resource information reserved by at least one other transmitting UE may be configured to be excluded from the selected at least one radio resource included in the preferred resource set information.

Alternatively, the controller 1710 may select non-preferred resource set information based on the sidelink reservation resource information of another transmitting UE. Specifically, the non-preferred resource set information includes at least one radio resource determined based on the sidelink reservation resource information reserved by at least one other transmitting UE that the receiving UE receives and the RSRP measurement value measured by the receiving UE.

Similar to the preferred resource set information, for a reserved resource having the RSRP measurement value above a certain level, the controller 1710 may configure the coordination information. Alternatively, the controller 1710 may include both i) the reserved resource reserved by another transmitting UE and ii) the radio resource having the RSRP measurement value measured by the receiving UE higher than a predetermined level in the non-preferred resource set information.

As another example, the transmission trigger condition of the coordination information includes detection of overlapping in the time domain or frequency domain between resource allocation to another transmitting user equipment and resource allocation to the transmitting UE identified by the controller 1710 in the case of the second type. The controller 1710 may configure the second type of the coordination information including collision information when the radio resource indicated by the sidelink reservation resource information transmitted by the transmitting UE partially or fully overlaps with the sidelink reservation resource information reserved by at least one other transmitting UE received by the receiving UE.

The controller 1710 may determine whether the reserved resources of the transmitting UE and another transmitting UE overlap by using the sidelink reservation resource information transmitted by the transmitting UE and the sidelink reservation resource information transmitted by another UE. When they partially or fully overlap with each other, the controller 1710 may configure the coordination information including the resource collision information indicating whether collision of the sidelink reservation resource information transmitted by the transmitting UE occurs.

The transmitter 1720 may transmit the coordination information when the transmission trigger condition is satisfied. As an example, the transmitter 1720 may transmit the configured coordination information according to the type of the coordination information using at least one of a sidelink control channel such as the PSCCH, a sidelink data channel such as the PSSCH, and a sidelink feedback channel such as the PSFCH. For example, the first type coordination information about the preferred resource set or the non-preferred resource set may be transmitted through at least one channel of the PSCCH and the PSSCH. In contrast, the second type coordination information regarding the resource collision information may be transmitted through the PSFCH.

The transmitter 1720 may transmit the coordination information according to whether the transmission trigger condition of the coordination information is satisfied. As described above, the transmission trigger condition may be configured to be satisfied when the explicit reporting request information is received from the transmitting UE. The transmission trigger condition of the coordination information may be configured to be satisfied when a pre-configured transmission period arrives. In this case, the coordination information may be configured to include preferred resource set information or non-preferred resource set information.

Alternatively, the transmission trigger condition may be configured to be satisfied when the overlapping in the time domain or frequency domain between resource allocation to another transmitting UE and resource allocation to the transmitting UE identified or confirmed by the controller 1710 is detected. In this case, the coordination information may be configured to include the resource collision information.

The receiver 1730 may receive resource reallocation information for sidelink transmission configured based on the transmitted coordination information and a sensing result of the transmitting UE. The transmitting UE may select or reselect the radio resource for the sidelink communication based on the received coordination information.

Accordingly, in the NR sidelink communication, when the mode 2-based sidelink resource allocation method is applied, the receiving UE 1700 for transmitting and receiving the coordination information for the sidelink communication may be capable of avoiding sidelink transmission resource collision between UEs.

Figure 18:
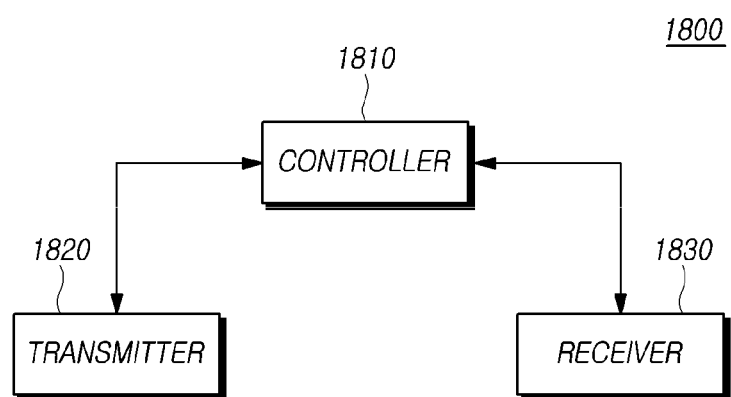
FIG. 18 is a diagram showing a transmitting UE according to an embodiment of the present disclosure.

FIG. 18 is a diagram showing a transmitting UE according to an embodiment of the present disclosure.

Referring to FIG. 18, a transmitting UE 1800 includes a controller 1810, a transmitter 1820 and a receiver 1830. The receiver 1820 and the transmitter 1830 may be collectively referred to as a transceiver.

The controller 1810 controls overall operations of the receiving UE 1800 for performing transmission/reception of the coordination information through a sidelink (SL) with a transmitting UE in the next-generation radio access network according to the embodiments described above. The transmitter 1820 transmits uplink control information and data or messages to the base station via a corresponding channel, and uplink control information and data or messages to the transmitting UE or the sidelink scheduling UE via a corresponding channel. The receiver 1830 receives the downlink control information and data or messages to the base station via a corresponding channel, and uplink control information and data or messages to the transmitting UE or the sidelink scheduling UE via a corresponding channel.

The controller 1810 may enable transmission and reception of coordination information between the UEs. When an inter-UE coordination procedure is required as described above in FIG. 16, the controller 1810 may enable transmission/reception of the coordination information between the UEs. In this case, as an example, it is assumed that the receiving UE and the transmitting UE support the use of the coordination information between the UEs. Reversely, the transmitting UE may disable transmission/reception of the coordination information between the UEs.

However, as another example, it may be requested to confirm whether the receiving UE and the transmitting UE each support the use of coordination information between UEs. In this case, the transmitter 1820 may transmit capability information for the coordination information to the receiving UE, and the receiver 1830 may receive the capability information for the coordination information from the receiving UE.

That is, whether the coordination information is supported for each UE may be transmitted between the base station and the UE through capability signaling. Specifically, the capability information may be information related to whether transmission/reception is supported for the coordination information or the type or format of the supported coordination information.

As an example, the controller 1810 may determine whether to enable the transmission/reception of the coordination information based on explicit signaling. For example, whether to enable the transmission/reception of the coordination information may be configured through higher layer signaling such as RRC signaling. Alternatively, whether to enable the transmission/reception of the coordination information may be indicated through the sidelink control information. Alternatively, whether to enable transmission and reception of coordination information may be implicitly configured according to a pre-configuration, such as whether a specific SCI format is used.

The transmitter 1830 may transmit the sidelink reservation resource information including radio resource information selected for the sidelink transmission from the transmitting UE. The sidelink reservation resource information may be transmitted in the sidelink control information. The sidelink control information is transmitted through the PSCCH and the PSSCH. The sidelink reservation resource information may be transmitted through at least one channel of the PSCCH and the PSSCH. The controller 1810 may configure the coordination information based on the reserved resource information received from the transmitting UE.

The type of coordination information includes a first type including information on the preferred resource set or the non-preferred resource set for the transmitting UE, and a second type including resource conflict information for the transmitting UE. That is, when the transmitting terminal receives the coordination information, the receiving UE may distinguish the first type of the coordination information including information on a preferred resource set or a non-preferred resource set and the second type of the coordination information including the resource conflict information such as the resource conflict indication information.

The controller 1810 may trigger transmission of the coordination information according to the type of the coordination information.

As an example, the transmission trigger condition of the coordination information includes reception of explicit reporting request information from the transmitting user equipment in the case of the first type. The receiving UE may determine that the transmission trigger condition of the coordination information is satisfied when the receiving UE receives the explicit reporting request information from the transmitting UE. Then the receiving UE may configure the first type of the coordination information. That is, the controller 1810 may trigger the transmission of the coordination information through transmission of the explicit reporting request information. The transmitting UE may transmit the request information through the sidelink control information. In this case, the receiving UE may configure the coordination information including a preferred resource or a non-preferred resource set.

As an example, the coordination information including information on the preferred resource set or the non-preferred resource set may be configured based on an RSRP value for another receiving UE identified or confirmed by the receiving UE. The receiving UE may select preferred resource set information based on the sidelink reservation resource information of another receiving UE. Specifically, the sidelink reservation resource information having an RSRP measurement value greater than a pre-configured threshold among the sidelink reservation resource information reserved by at least one other receiving UE may be configured to be excluded from the selected at least one radio resource included in the preferred resource set information.

Alternatively, the receiving UE may select non-preferred resource set information based on the sidelink reservation resource information of another receiving UE. Specifically, the non-preferred resource set information includes at least one radio resource determined based on the sidelink reservation resource information reserved by at least one other receiving UE that the transmitting UE receives and the RSRP measurement value measured by the receiving UE.

As another example, the transmission trigger condition of the coordination information includes detection of overlapping in the time domain or frequency domain between resource allocation to another transmitting UE and resource allocation to the transmitting UE identified by the receiving UE in the case of the second type. That is, detection of occurrence of an overlap detection event may correspond to the transmission trigger condition. The receiving UE may configure the second type of the coordination information including collision information when the radio resource indicated by the sidelink reservation resource information transmitted by the transmitting UE partially or fully overlaps with the sidelink reservation resource information reserved by at least one other transmitting UE received by the receiving UE.

As an example, the receiver 1830 may transmit the configured coordination information according to the type of the coordination information using at least one of a sidelink control channel such as the PSCCH, a sidelink data channel such as the PSSCH, and a sidelink feedback channel such as the PSFCH. For example, the first type coordination information about the preferred resource set or the non-preferred resource set may be transmitted through at least one channel of the PSCCH and the PSSCH. In contrast, the second type coordination information regarding the resource collision information may be transmitted through the PSFCH.

The receiver 1830 may receive the coordination information the coordination information according to whether the transmission trigger condition of the coordination information is satisfied. As described above, the transmission trigger condition may be configured to be satisfied when the explicit reporting request information is received from the transmitting UE. Further, the transmission trigger condition of the coordination information may be configured to be satisfied when a pre-configured transmission period arrives. In this case, the coordination information may be configured to include preferred resource set information or non-preferred resource set information.

Alternatively, the transmission trigger condition may be configured to be satisfied when the overlapping in the time domain or frequency domain between resource allocation to another transmitting UE and resource allocation to the transmitting UE identified or confirmed by the receiving UE is detected. In this case, the coordination information may be configured to include the resource collision information.

The transmitter may transmit resource reallocation information for sidelink transmission configured based on the transmitted coordination information and a sensing result of the transmitting UE. The controller 1810 may select or reselect the radio resource for the sidelink communication based on the received coordination information.

As an example, the controller 1810 may select or reselect the sidelink resource based on the coordination information and the sensing result sensed in the sensing window as described in FIG. 11. The controller 1810 may select or reselect the radio resource by using at least one of preferred resource set or non-preferred resource set information included in the received coordination information and resource information selected as the sensing result.

When the preferred resource set information is included in the coordination information, the controller 1810 may select or reselect, as the sidelink resource, the radio resource commonly included in the resource information according to the sensing result and the preferred resource set information. Alternatively, when the preferred resource set information is included in the coordination information, the controller 1810 may select or reselect the sidelink resource from among radio resources included in the preferred resource set information without considering a sensing result.

Alternatively, when the non-preferred resource set information is included in the coordination information, the controller 1810 may select or reselect the sidelink resource from the resource information according to the sensing result except for the radio resource included in the non-preferred resource set information. When the resource information according to the sensing result sensed in the sensing window overlaps the radio resource included in the non-preferred resource set information, the controller 1810 may select or reselect the radio resource from the resource information according to the remaining sensing result except for the overlapped resource.

When the resource collision information is included in the coordination information, the controller 1810 may perform a radio resource reselection operation based on the received resource collision information. After then, the transmitter 1820 may transmit the resource reallocation information for the selected and reselected resource.

Accordingly, in the NR sidelink communication, when the mode 2-based sidelink resource allocation method is applied, the transmitting UE 1800 for transmitting and receiving the coordination information for the sidelink communication may be capable of avoiding sidelink transmission resource collision between UEs.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method of a receiving user equipment for performing transmission/reception through a sidelink (SL) with a transmitting user equipment, the method comprising:
   distinguishing a type of coordination information for the transmitting user equipment;
   determining whether a transmission trigger condition of the coordination information is satisfied according to the type of the coordination information; and
   transmitting the coordination information when the transmission trigger condition is satisfied,
   wherein the type of the coordination information comprises i) a first type including information on a preferred resource set or a non-preferred resource set for the transmitting user equipment and ii) a second type including resource conflict information for the transmitting user equipment, and
   wherein in the transmitting the coordination information, the coordination information is transmitted through one of a sidelink data channel (PSSCH) and a sidelink control channel in the case of the first type, and the coordination information is transmitted through a sidelink feedback channel in the case of the second type.

2. The method according to claim 1, wherein the transmission trigger condition of the coordination information includes reception of explicit reporting request information from the transmitting user equipment in the case of the first type.

3. The method according to claim 1, further comprising: receiving resource reallocation information for sidelink transmission configured based on the transmitted coordination information and a sensing result of the transmitting user equipment.

4. A method of a transmitting user equipment for performing transmission/reception through a sidelink (SL) with a receiving user equipment, the method comprising:
   distinguishing a type of coordination information;
   triggering transmission of the coordination information according to the type of the coordination information; and
   receiving the coordination information,
   wherein the type of the coordination information comprises i) a first type including information on a preferred resource set or a non-preferred resource set for the transmitting user equipment and ii) a second type including resource conflict information for the transmitting user equipment, and
   wherein in the receiving the coordination information, the coordination information is received through one of a sidelink data channel (PSSCH) and a sidelink control channel in the case of the first type, and the coordination information is received through a sidelink feedback channel in the case of the second type.

5. The method according to claim 4, wherein the transmission trigger condition of the coordination information comprises transmission of explicit reporting request information to the receiving user equipment in the case of the first type.

6. The method according to claim 4, further comprising: receiving resource reallocation information for sidelink transmission configured based on the received coordination information and a sensing result of the transmitting user equipment.

7. A receiving user equipment of performing transmission/reception through a sidelink (SL) with a transmitting user equipment, the receiving user equipment comprising:
   a controller configured to distinguish a type of coordination information for the transmitting user equipment and determine whether a transmission trigger condition of the coordination information is satisfied according to the type of the coordination information; and a transmitter configured to transmit the coordination information when the transmission trigger condition is satisfied, wherein the type of the coordination information comprises i) a first type including information on a preferred resource set or a non-preferred resource set for the transmitting user equipment and ii) a second type including resource conflict information for the transmitting user equipment, and wherein the transmitter transmits the coordination information through one of a sidelink data channel (PSSCH) and a sidelink control channel in the case of the first type, and the transmitter transmits the coordination information through a sidelink feedback channel in the case of the second type.

8. The receiving user equipment according to claim 7, wherein the transmission trigger condition of the coordination information includes reception of explicit reporting request information from the transmitting user equipment in the case of the first type.

9. The receiving user equipment according to claim 7, further comprising: a receiver configured to receive resource reallocation information for sidelink transmission configured based on the transmitted coordination information and a sensing result of the transmitting user equipment.

* * * * *